A. S. HOWELL.
BOX MAKING MACHINE.
APPLICATION FILED FEB. 11, 1915.
1,171,613.
Patented Feb. 15, 1916.
29 SHEETS—SHEET 1.
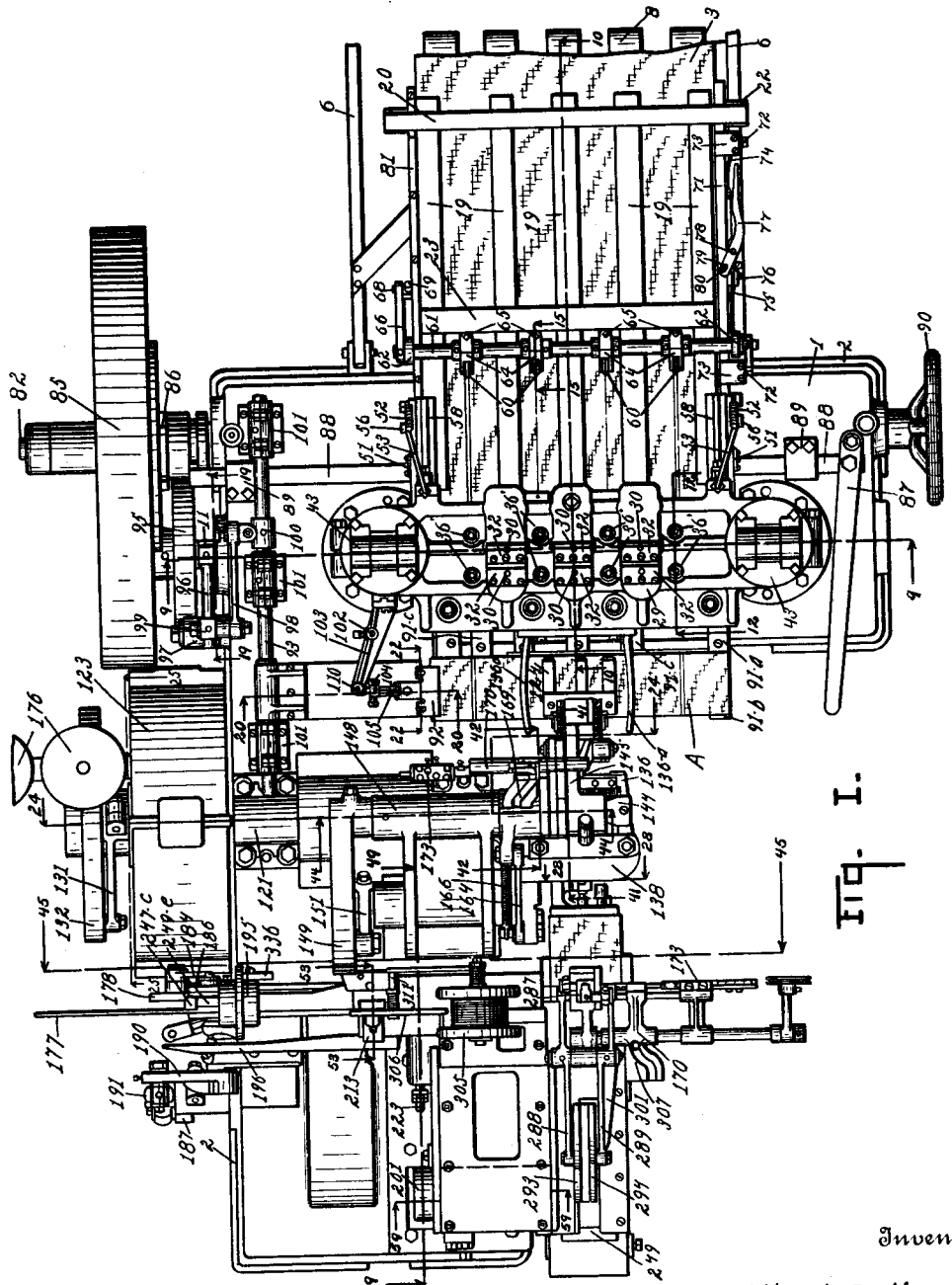
Fig. I.
Witnesses
L. C. Blake.
Lenn Gilman
Inventor
Albert S. Howell
By Chappell & Earl
Attorneys.

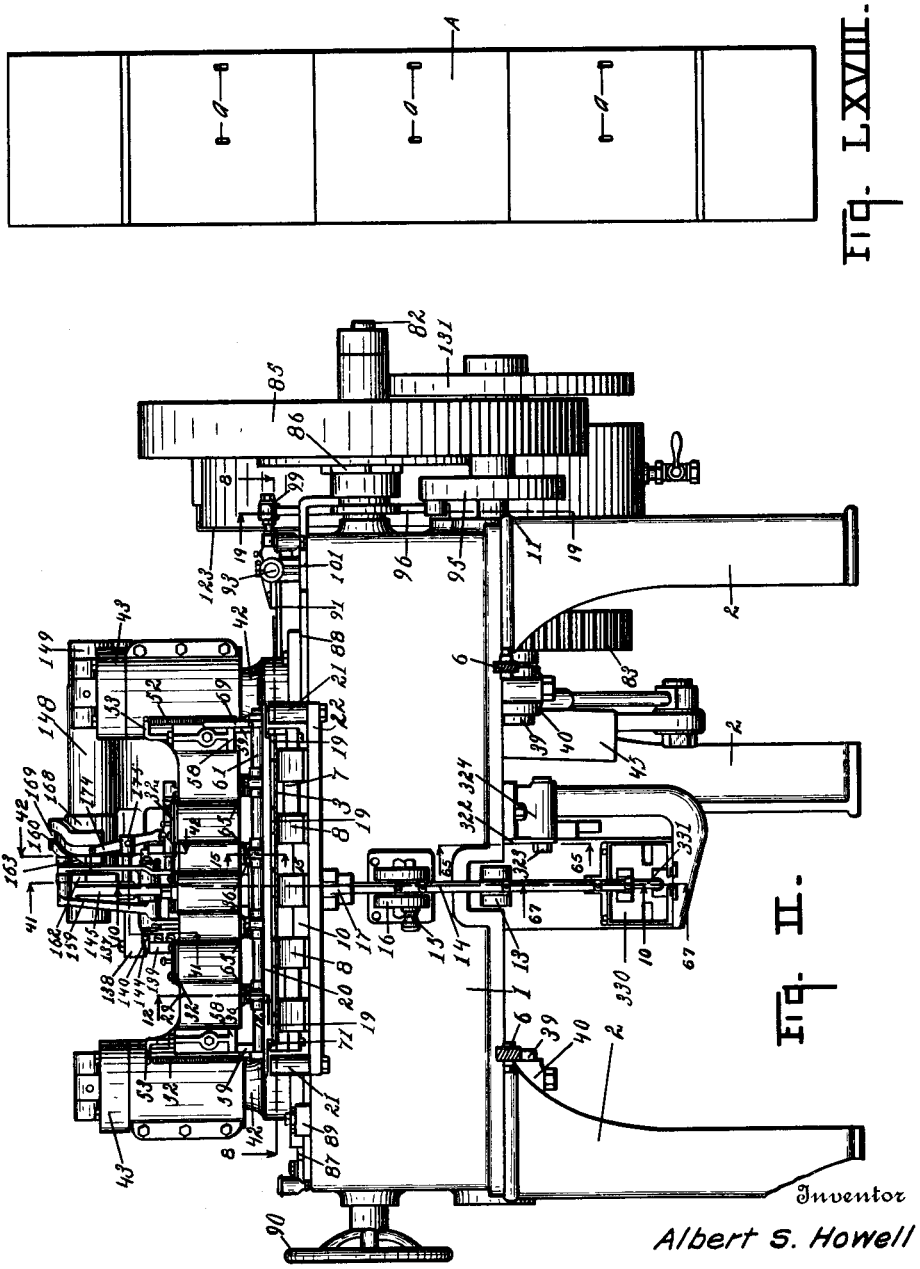

A. S. HOWELL.
BOX MAKING MACHINE.
APPLICATION FILED FEB. 11, 1915.
1,171,613.
Patented Feb. 15, 1916.
29 SHEETS—SHEET 3.
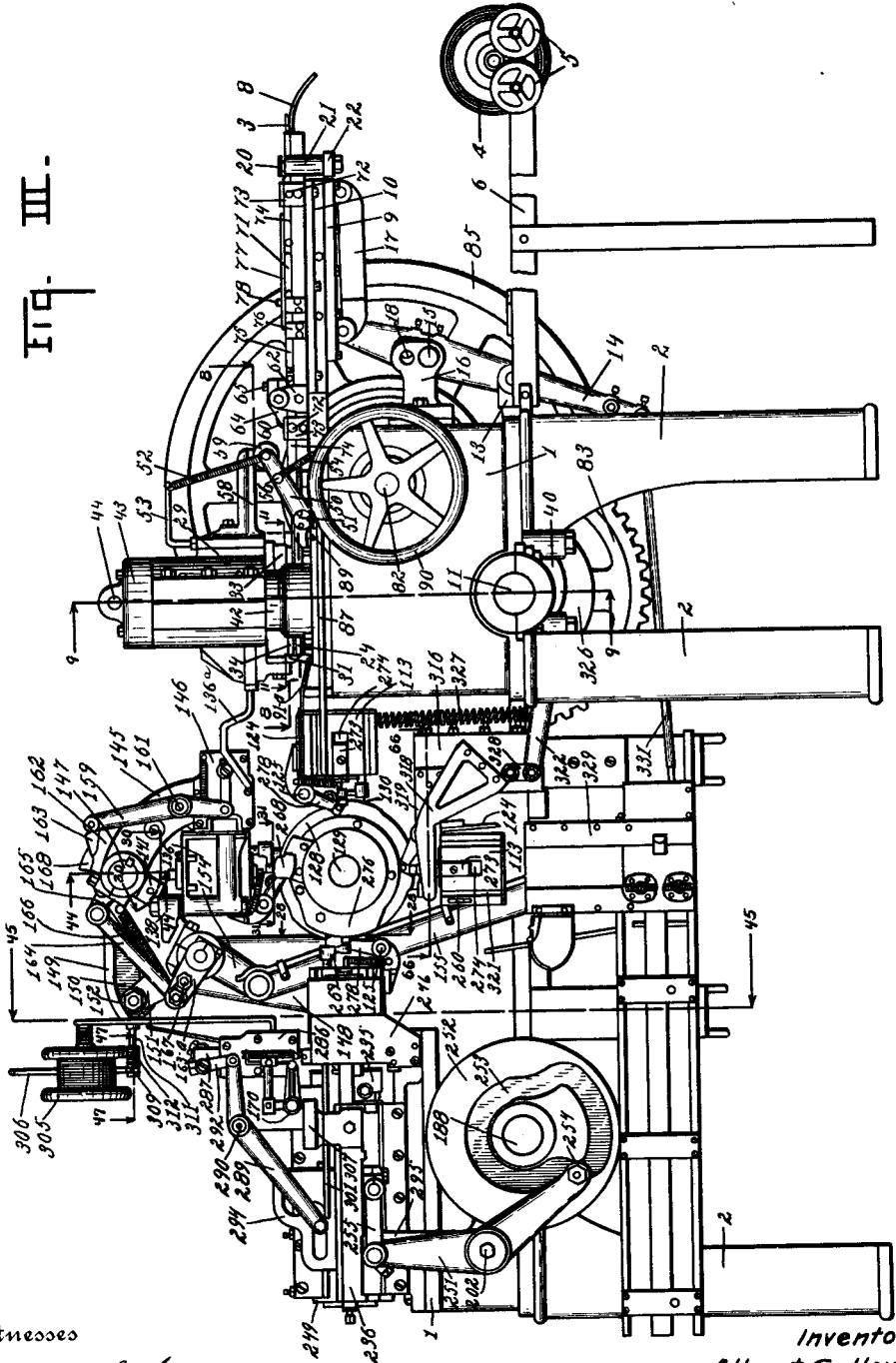
Witnesses
Le C Blake
Lenn Gilman
Inventor
Albert S. Howell
By
Chappell & Earl
Attorneys
THE COLUMBIA PLANOGRAPH CO., WASHINGTON, D. C.

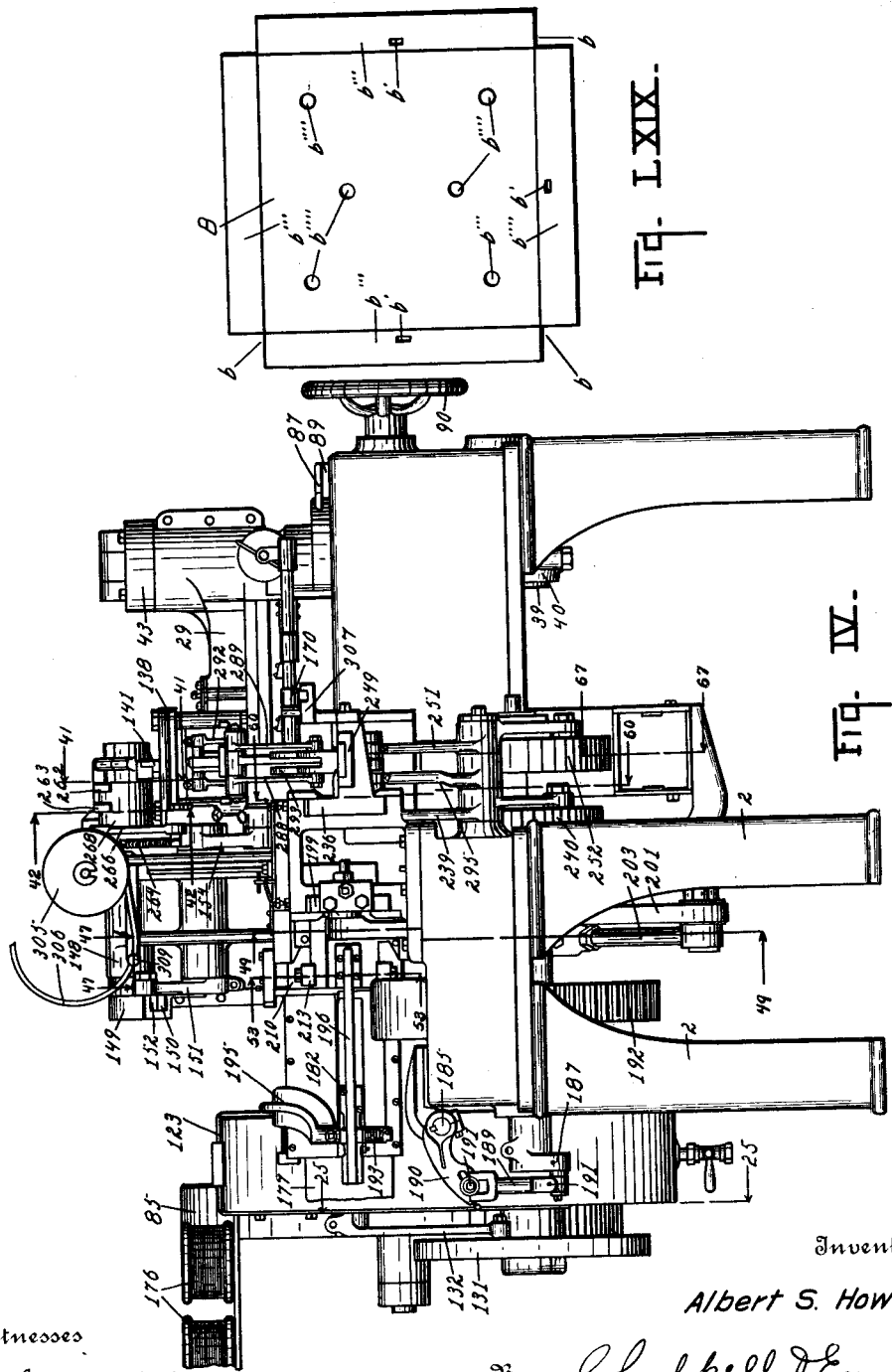

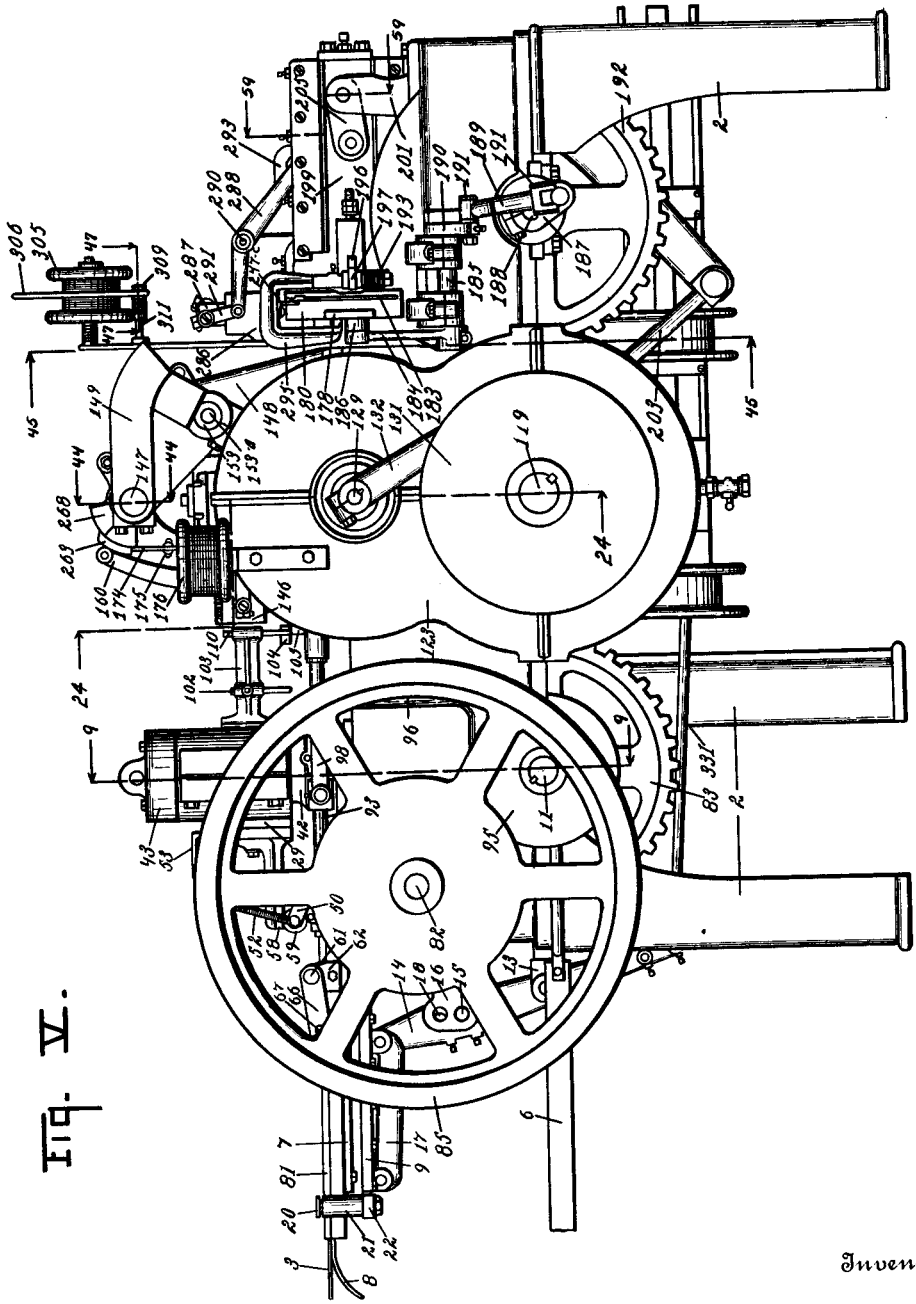

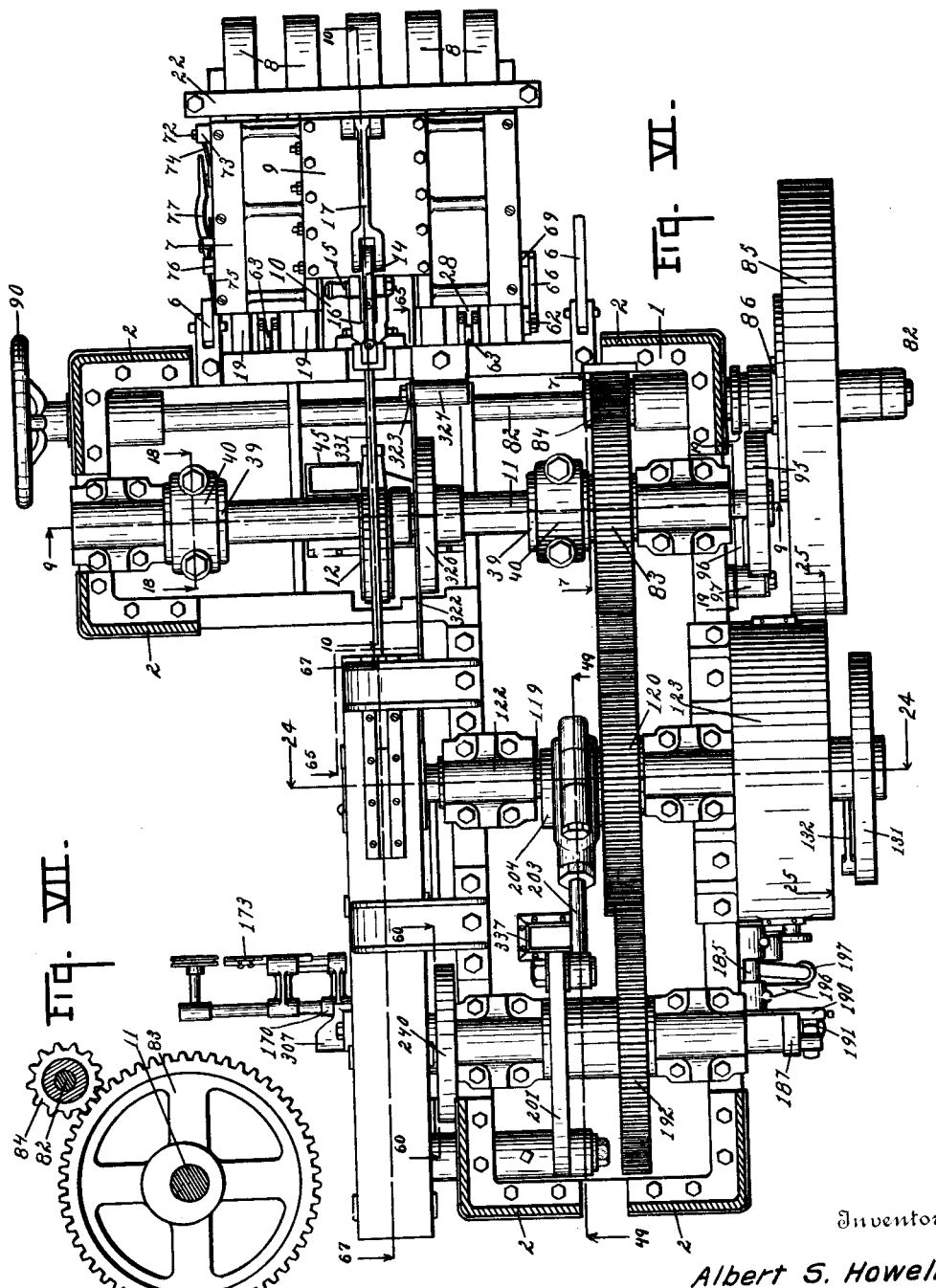

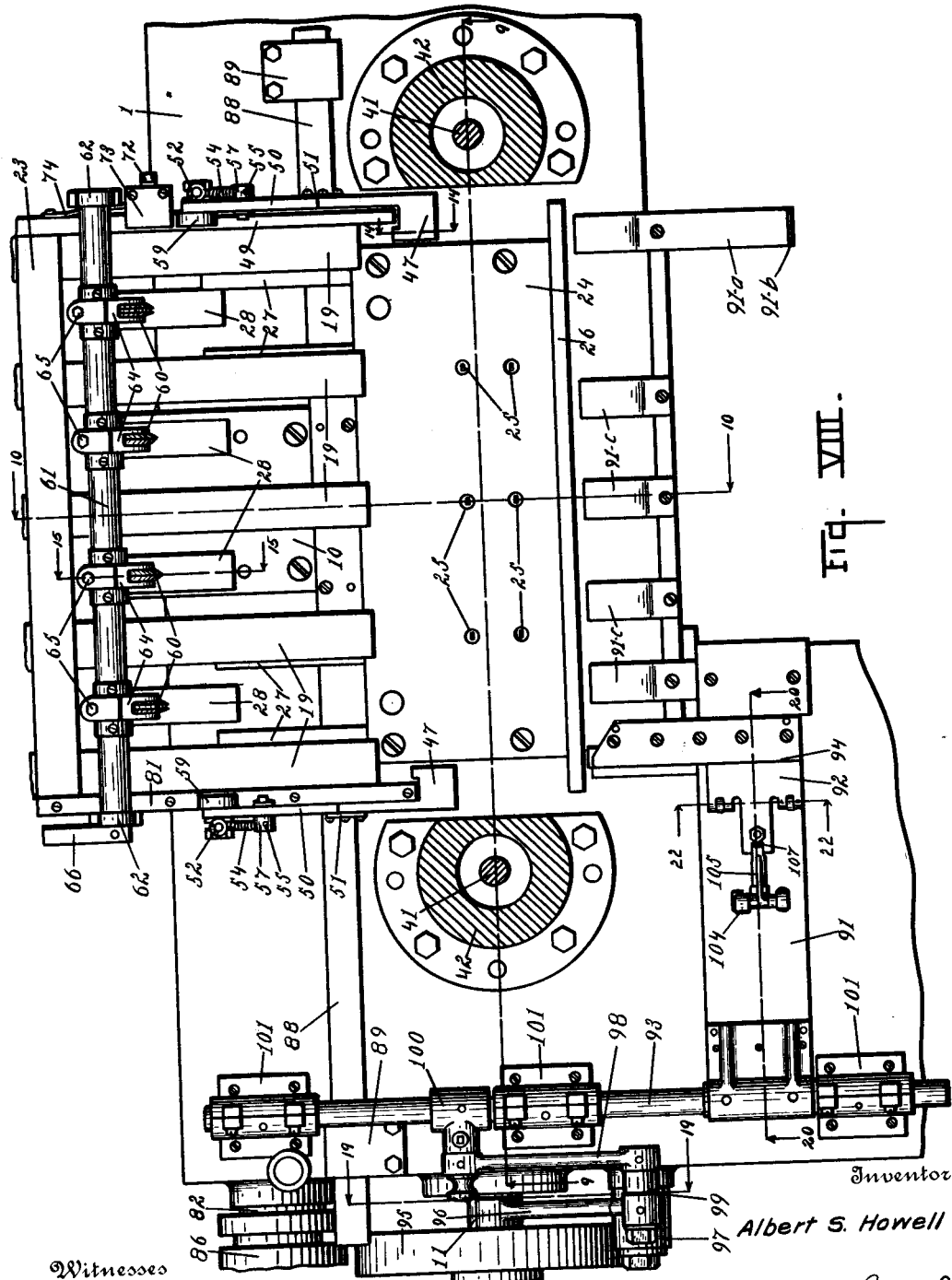

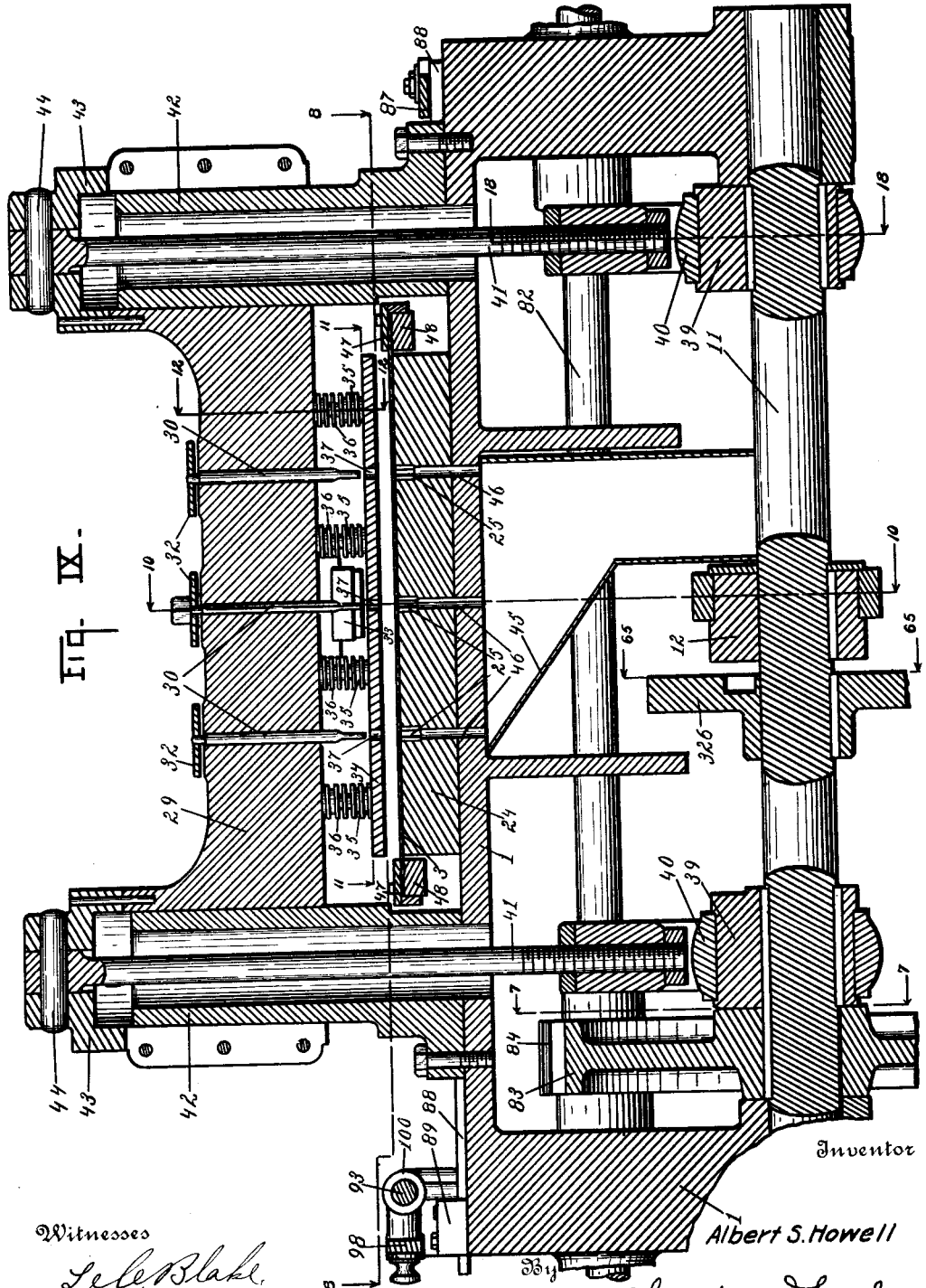

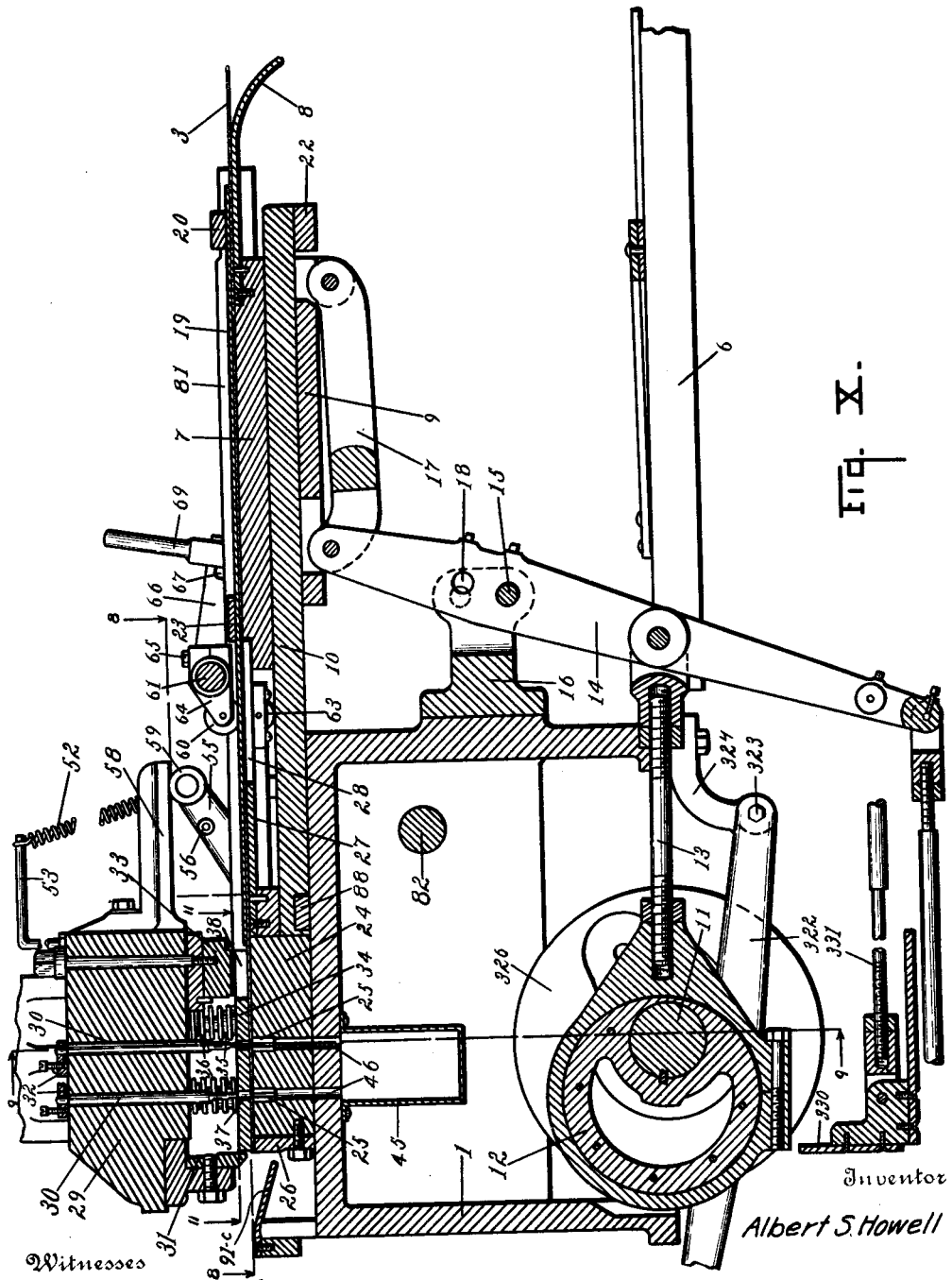

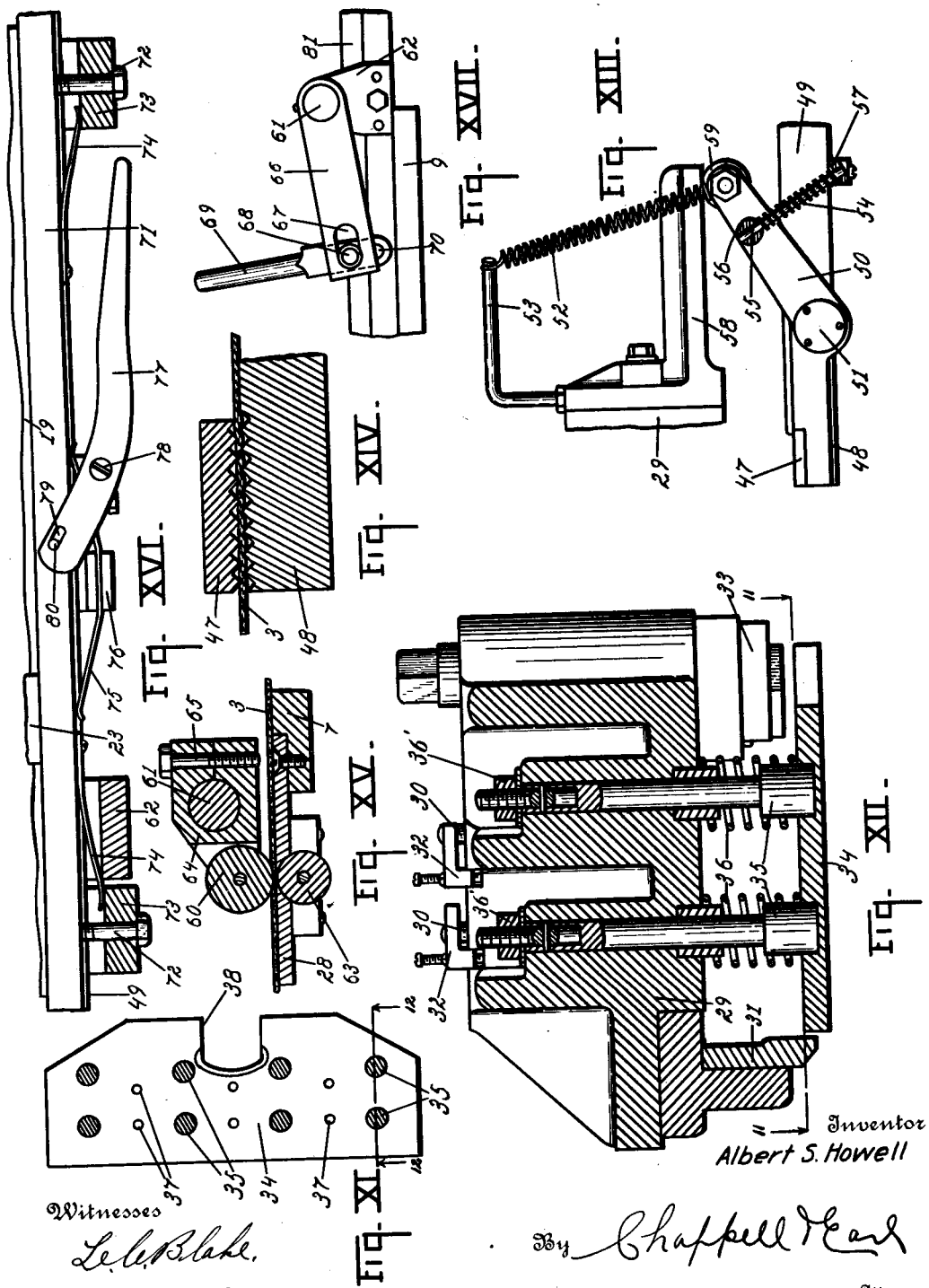

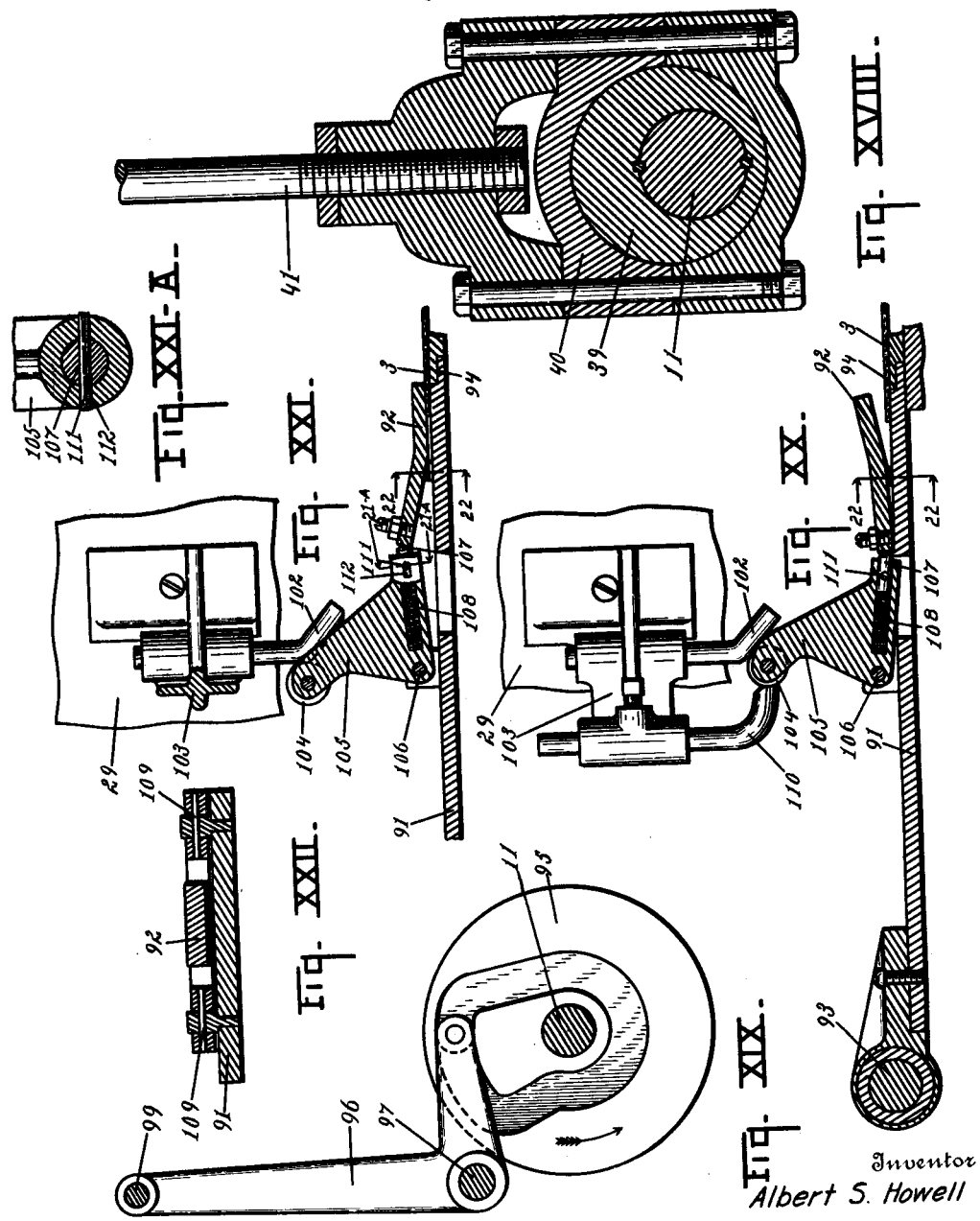

A. S. HOWELL.
BOX MAKING MACHINE.
APPLICATION FILED FEB. 11, 1915.
1,171,613.
Patented Feb. 15, 1916.
29 SHEETS—SHEET 12.
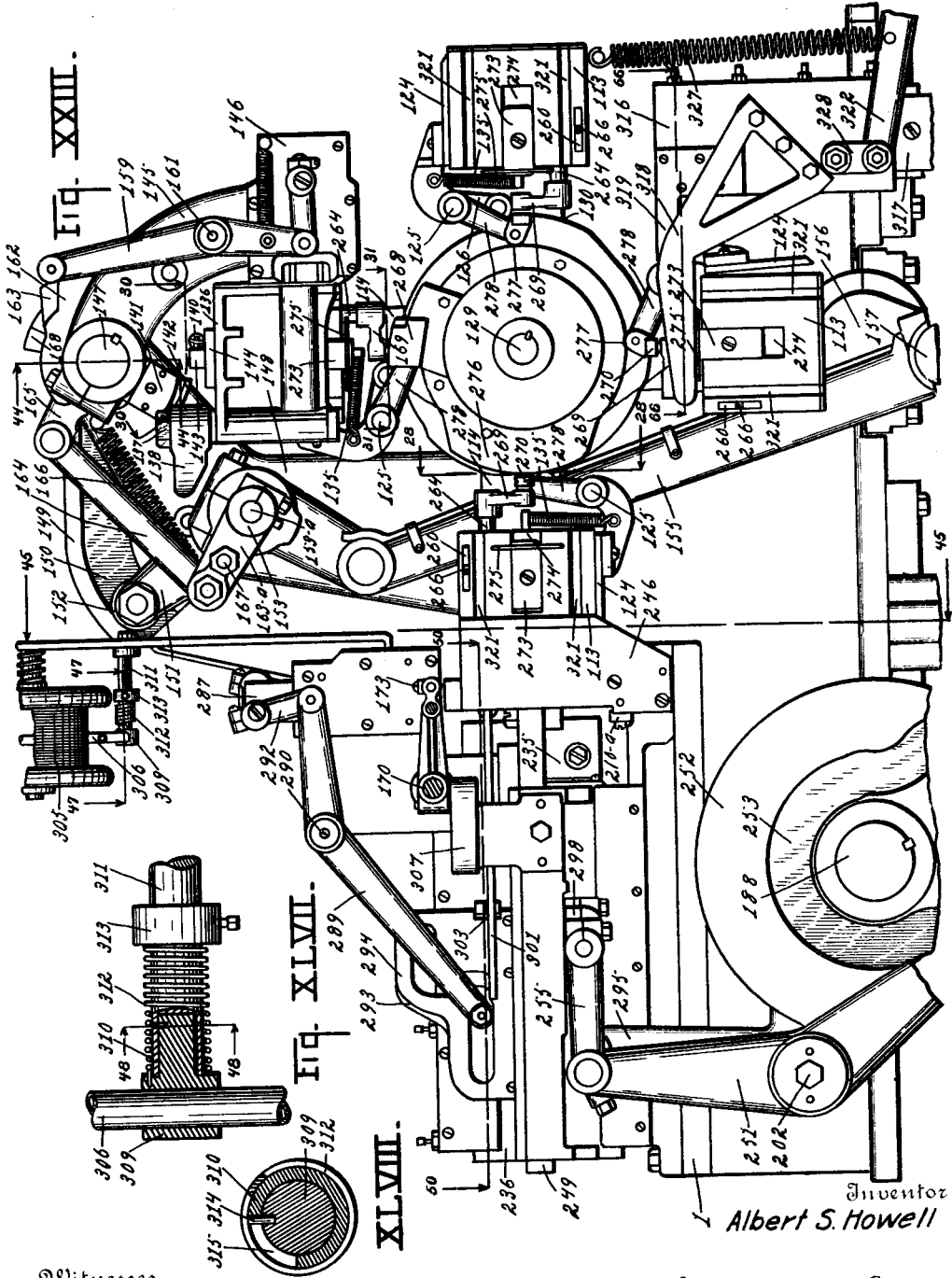
Inventor
Albert S. Howell
Witnesses
By Chappell & Earl
Attorneys

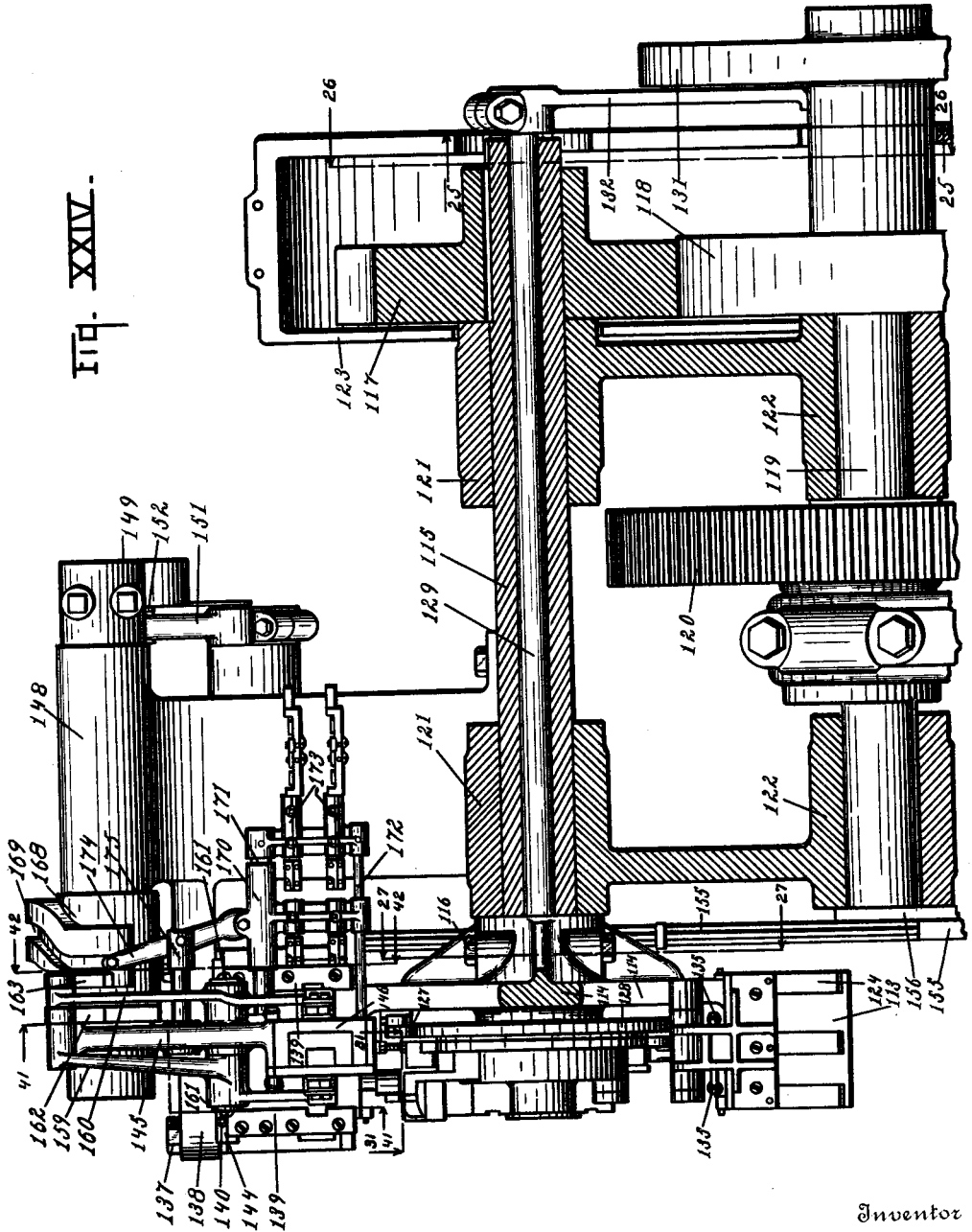

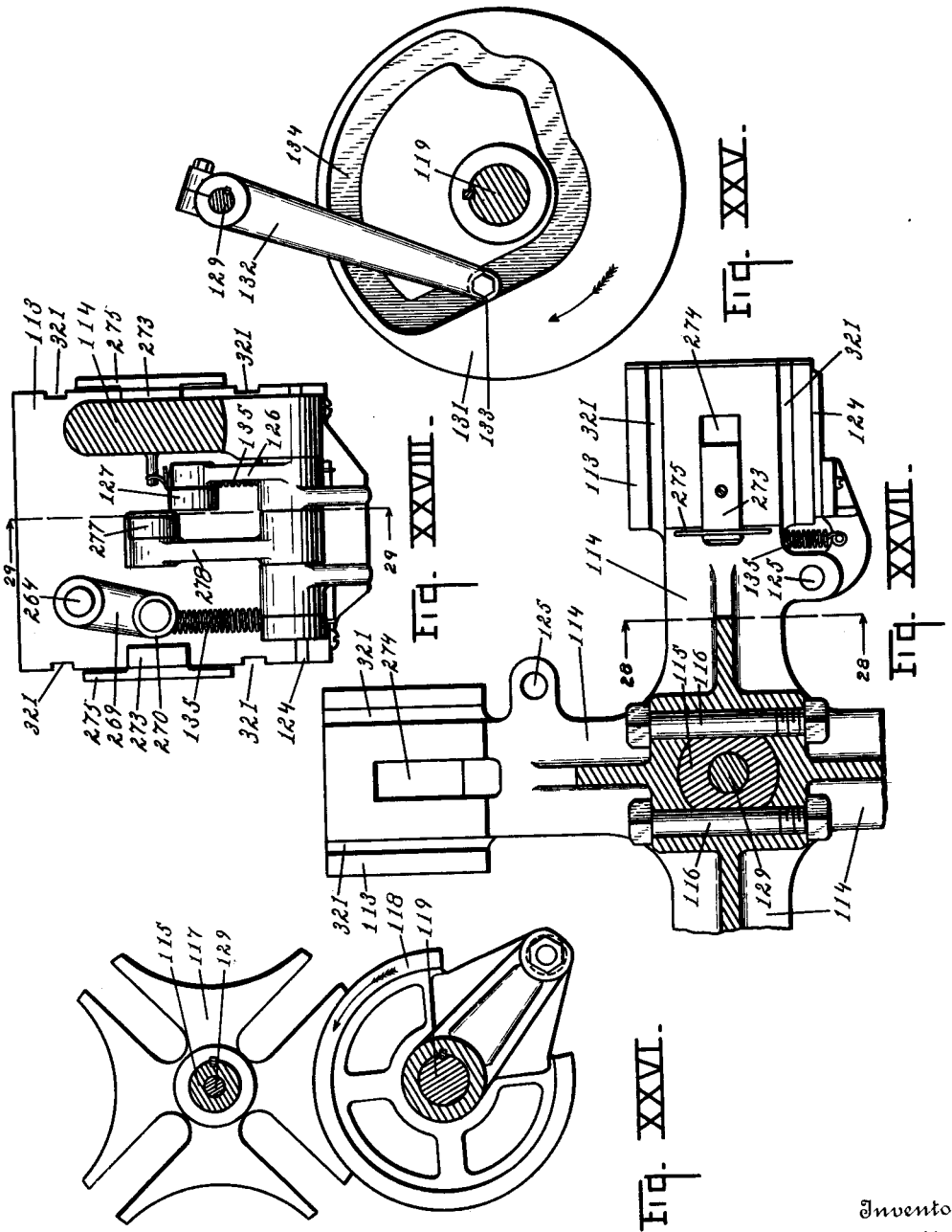

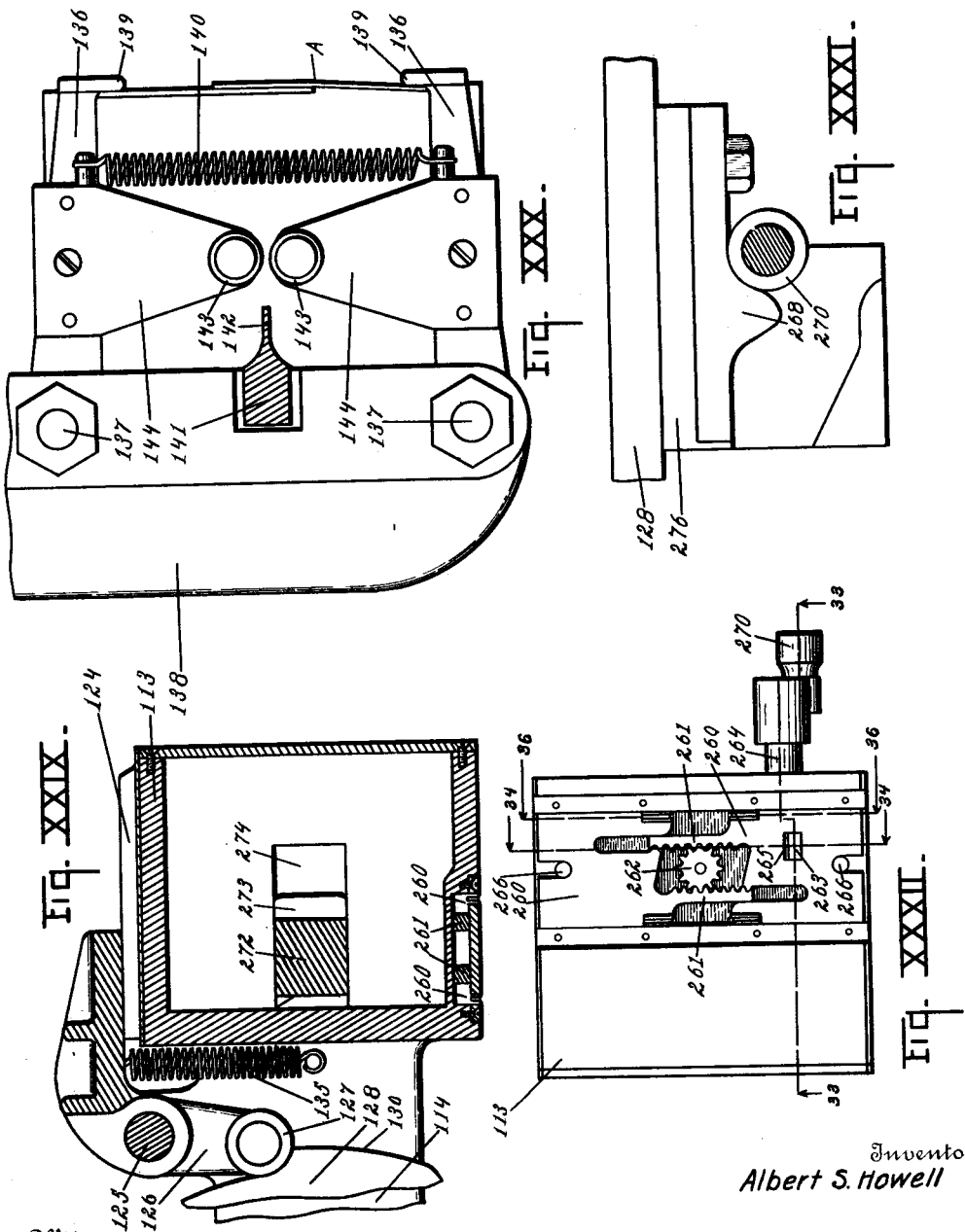

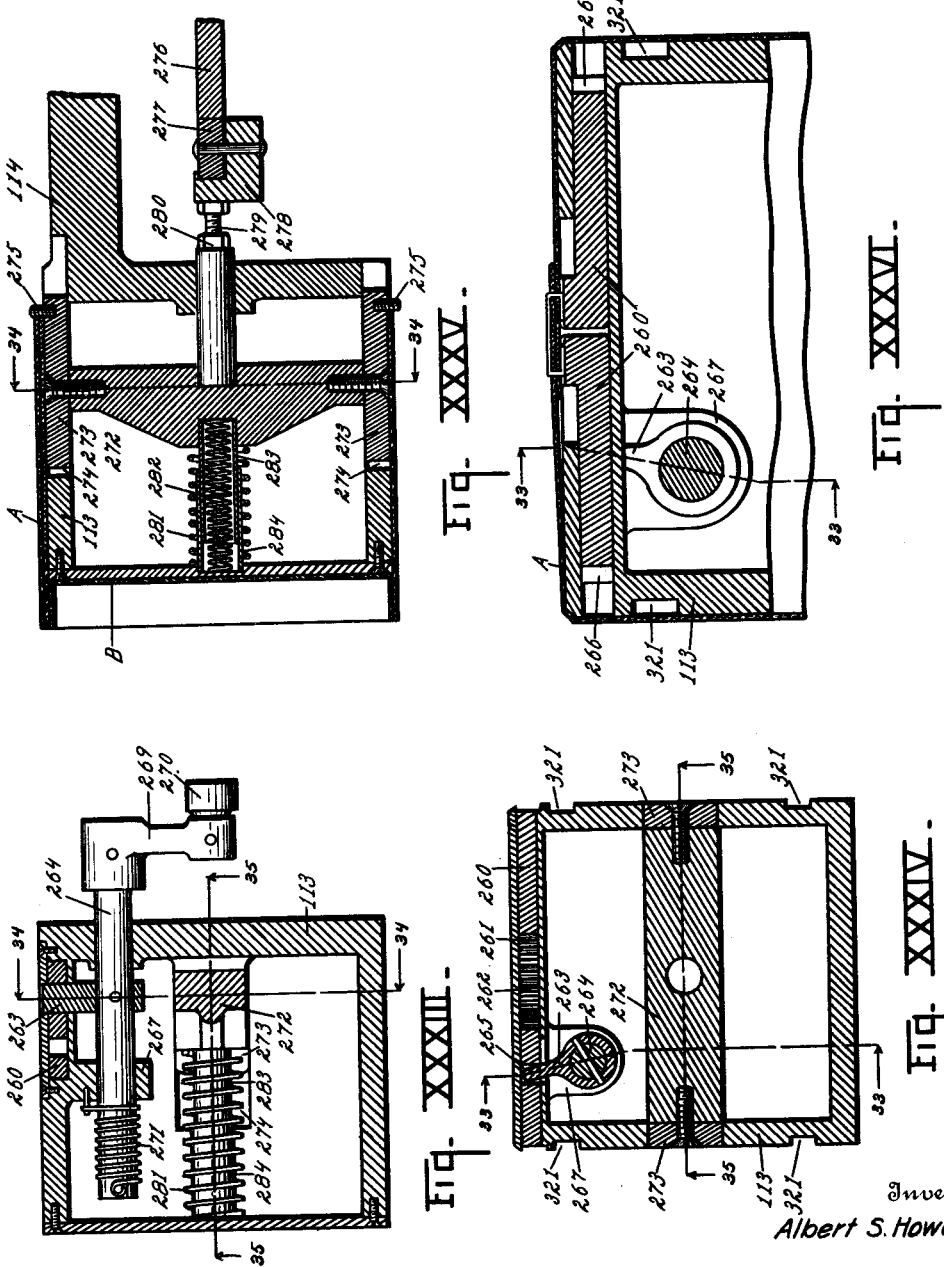

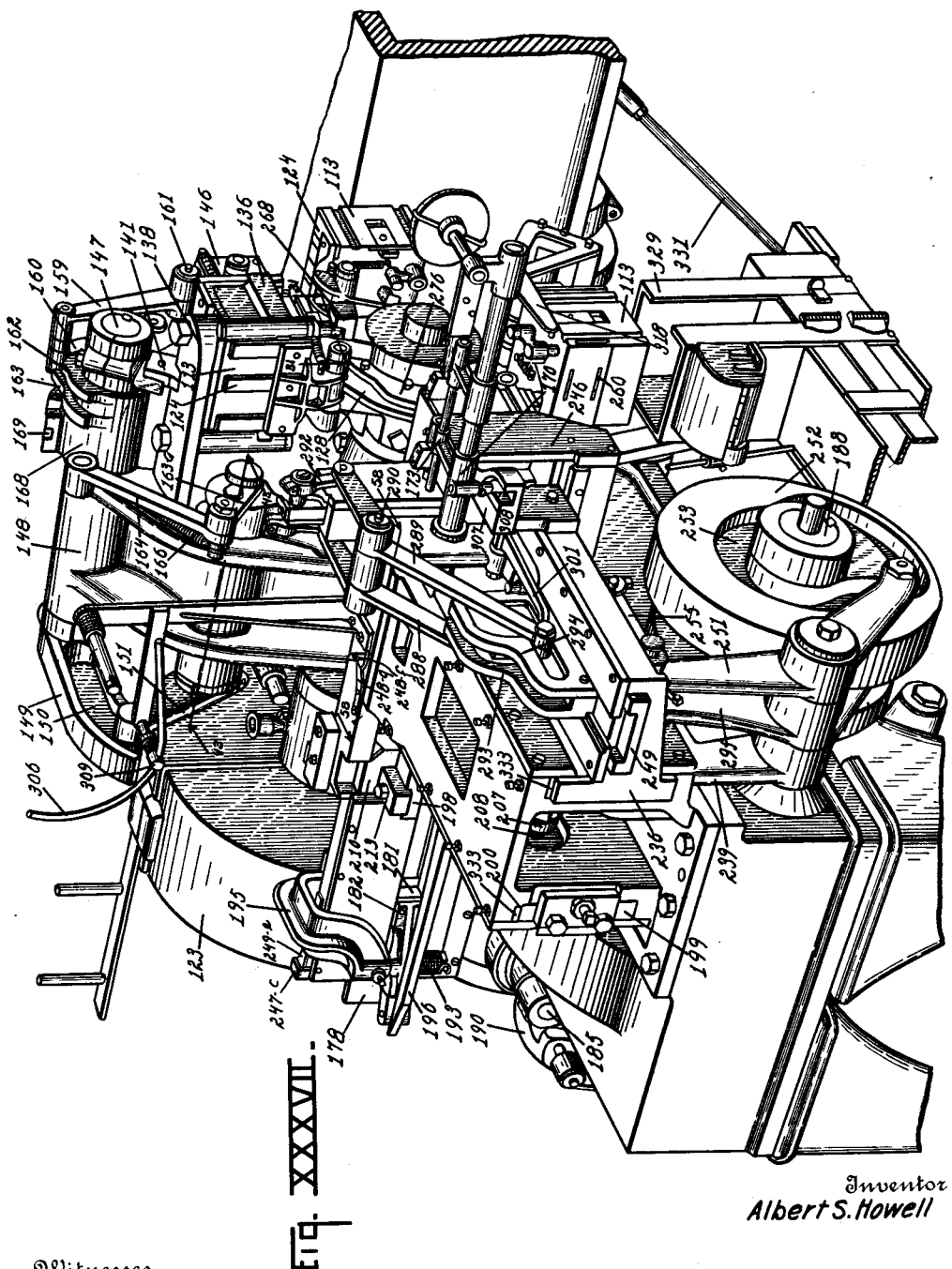

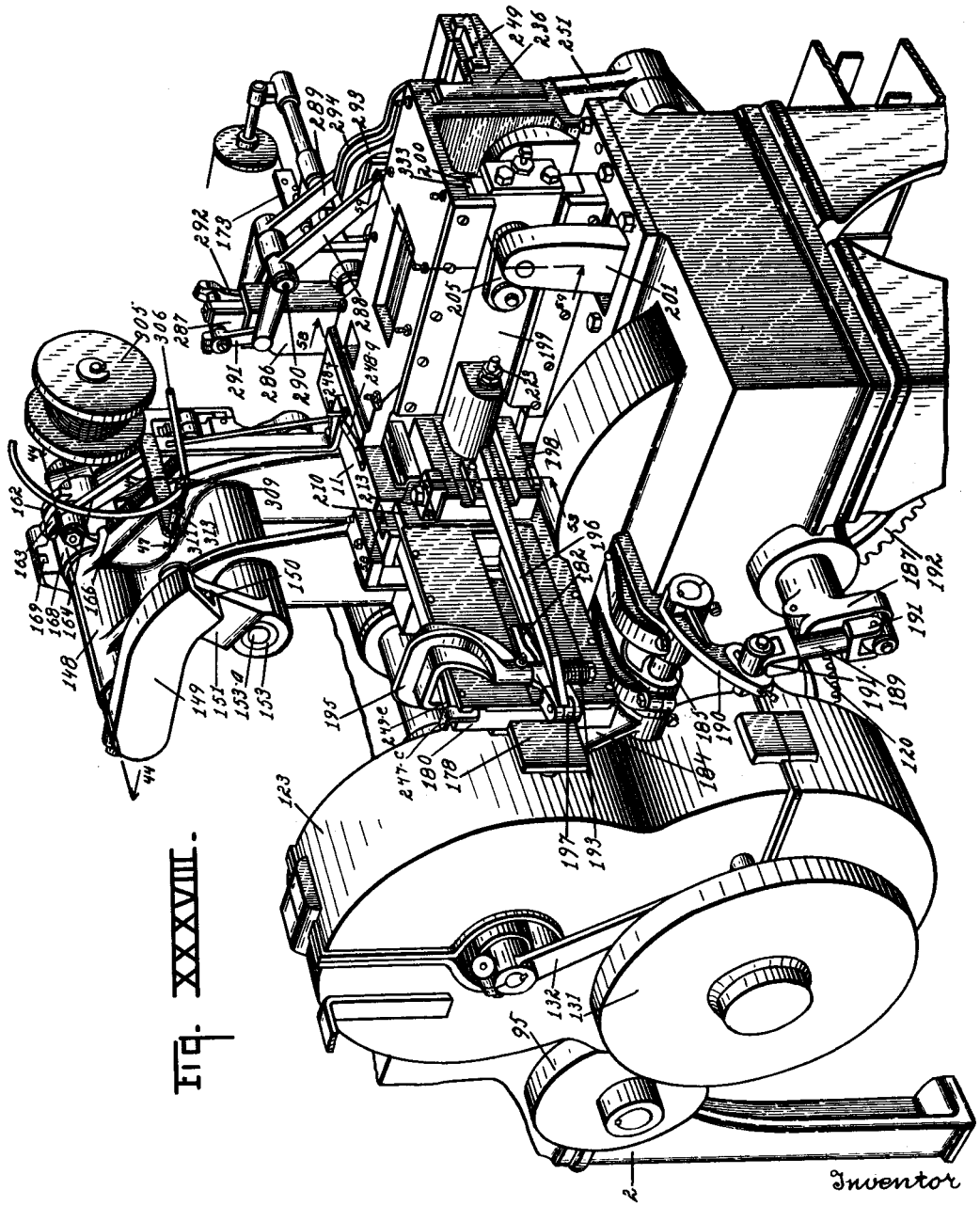

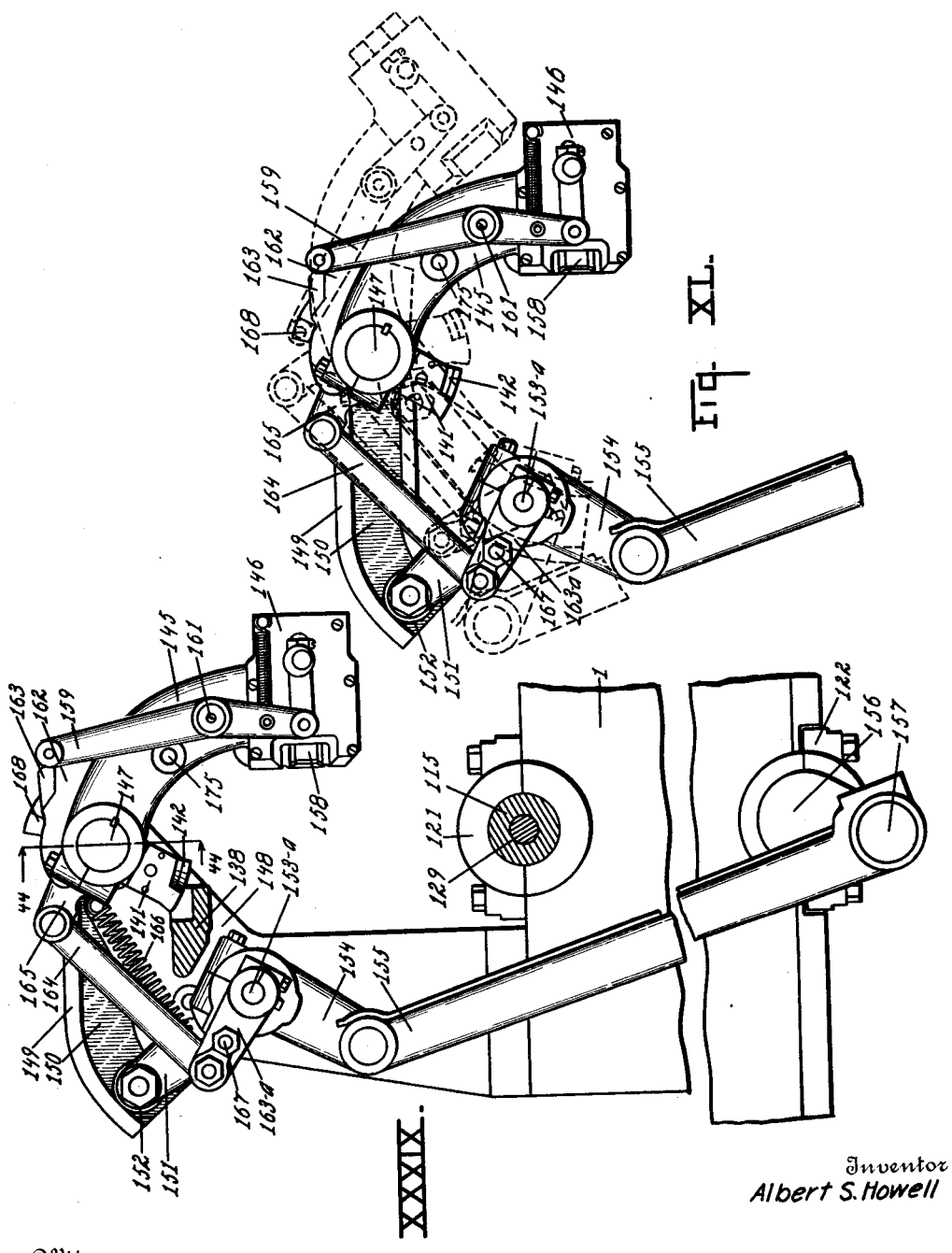

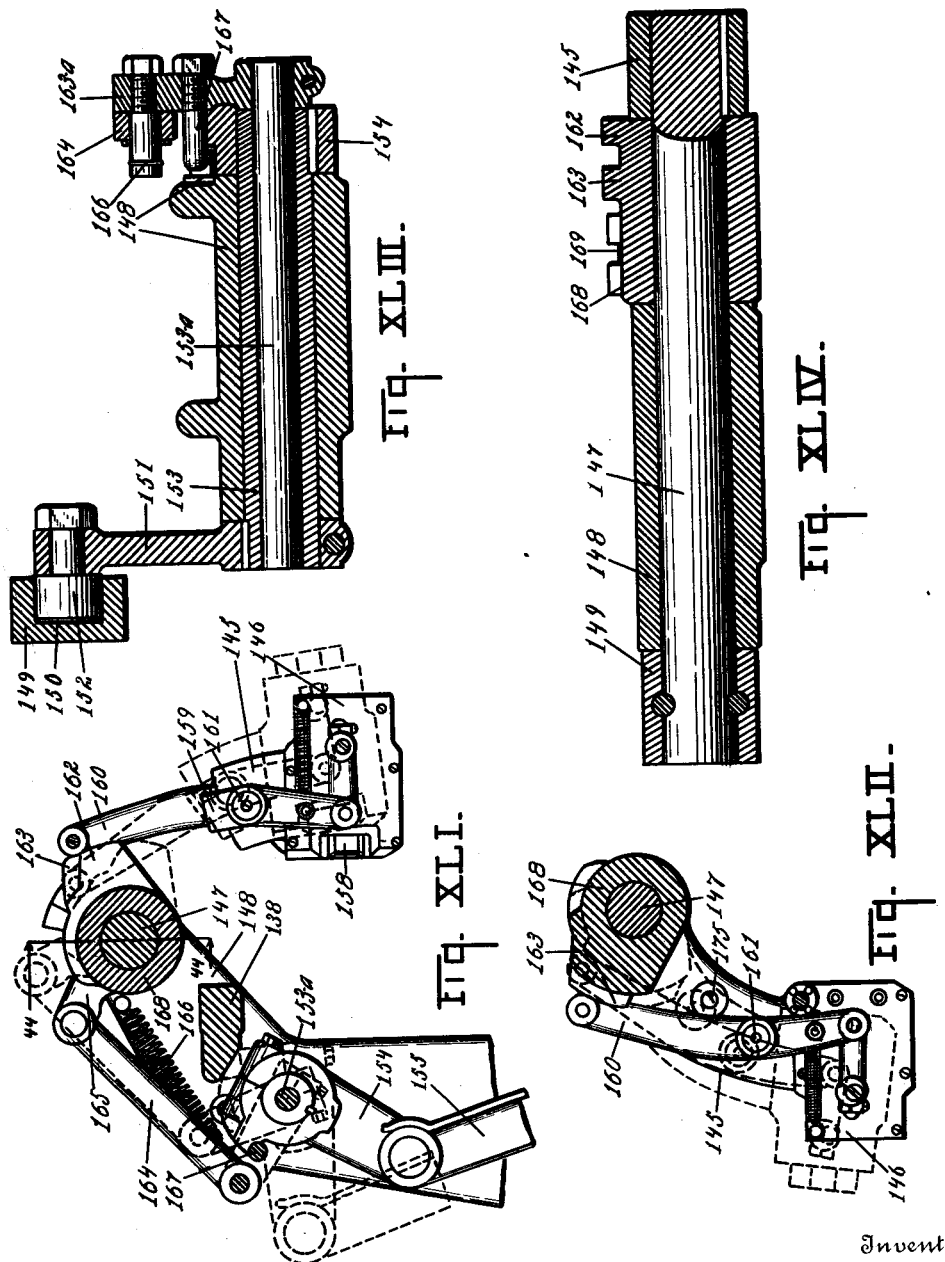

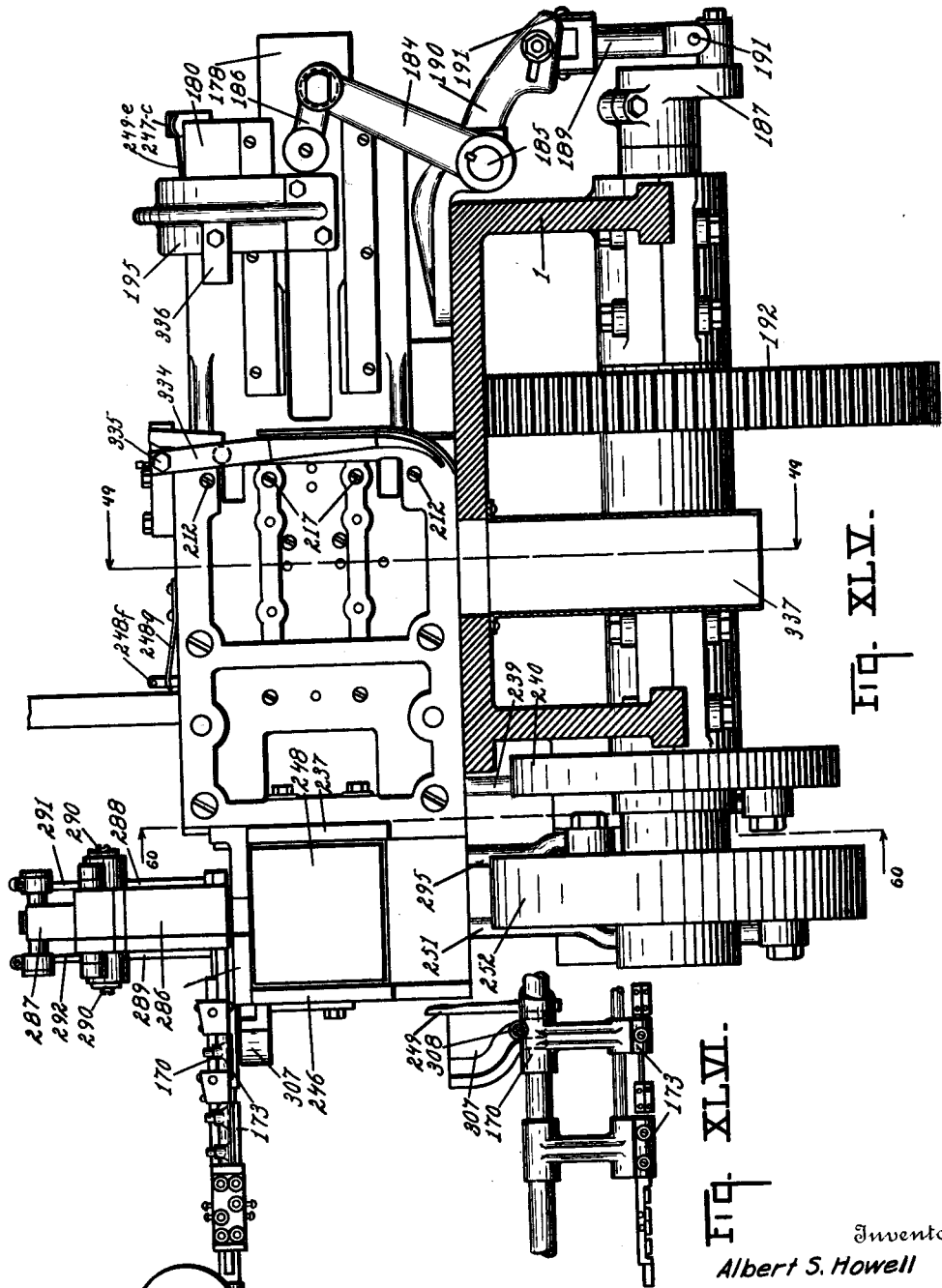

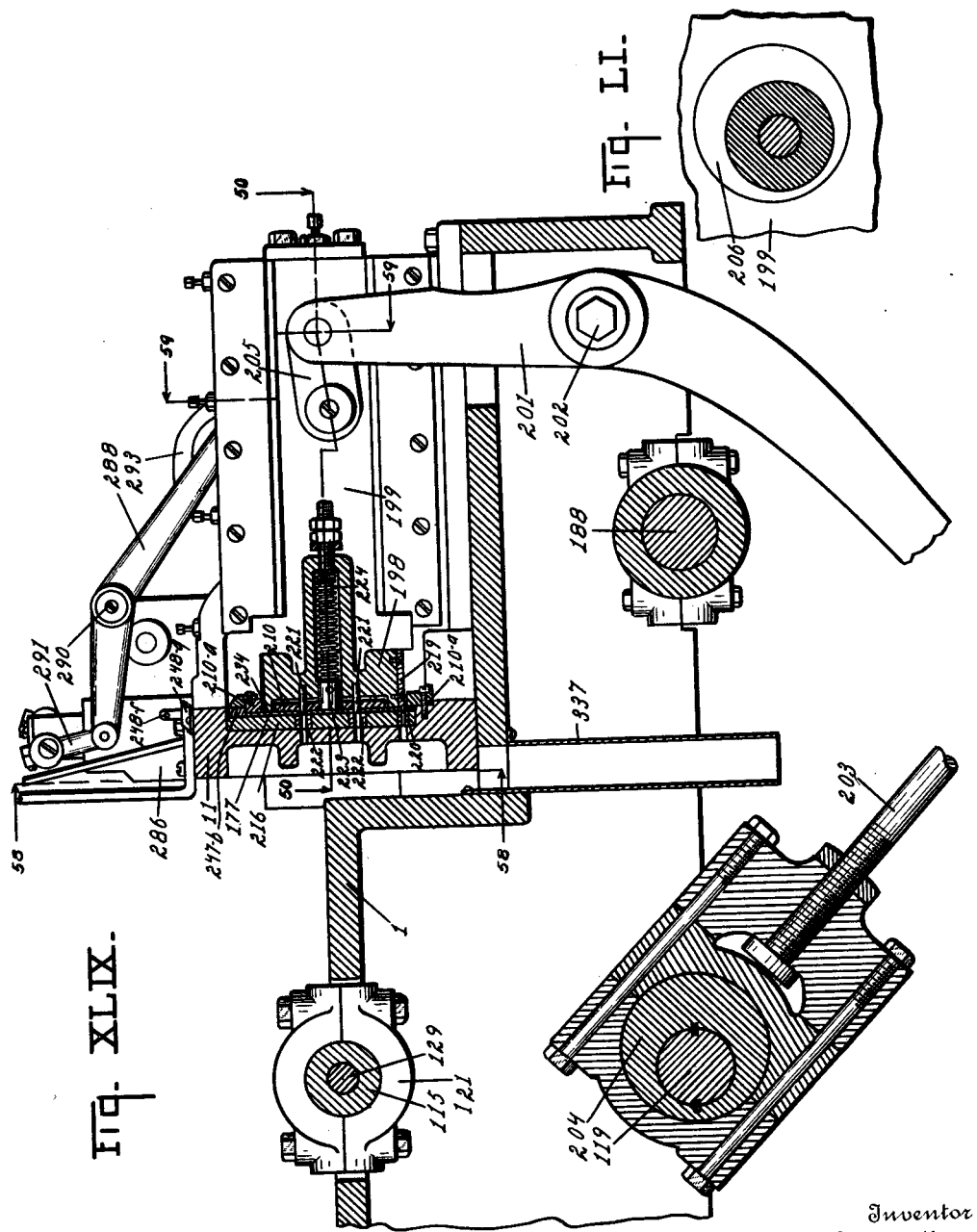

A. S. HOWELL.
BOX MAKING MACHINE.
APPLICATION FILED FEB. 11, 1915.
1,171,613.
Patented Feb. 15, 1916.
29 SHEETS—SHEET 23.
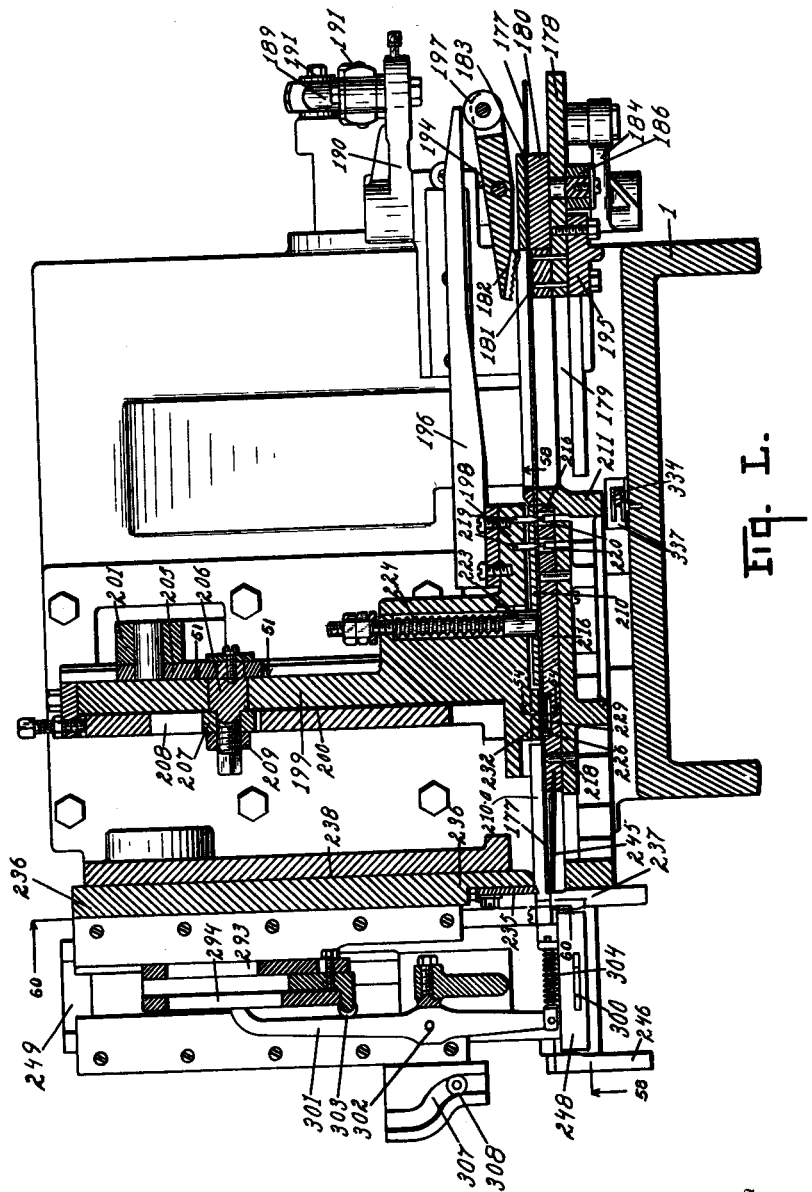
Inventor
Albert S. Howell
Witnesses
L. C. Blake
Lenn Gilman
By Chappell & Earl
Attorneys

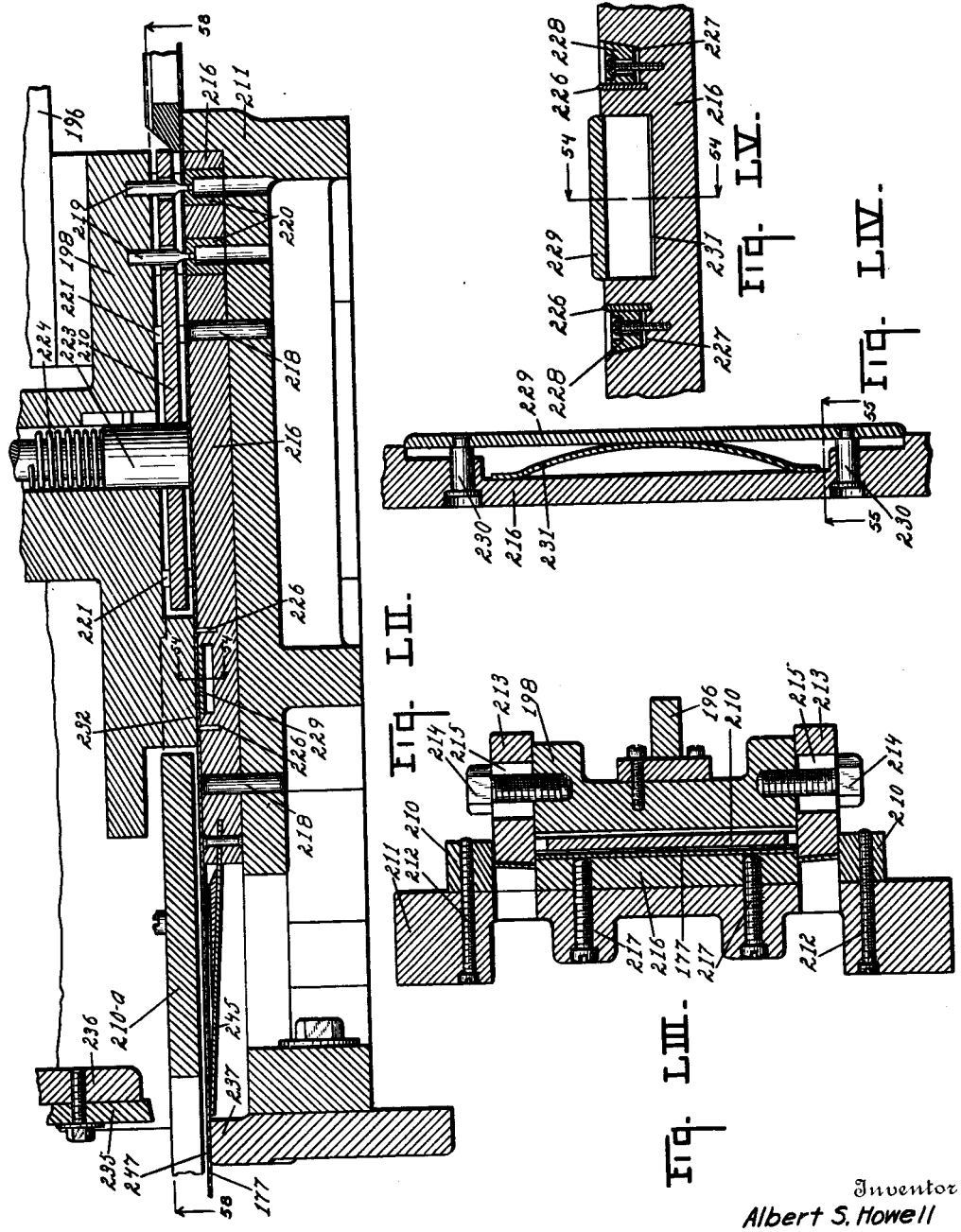

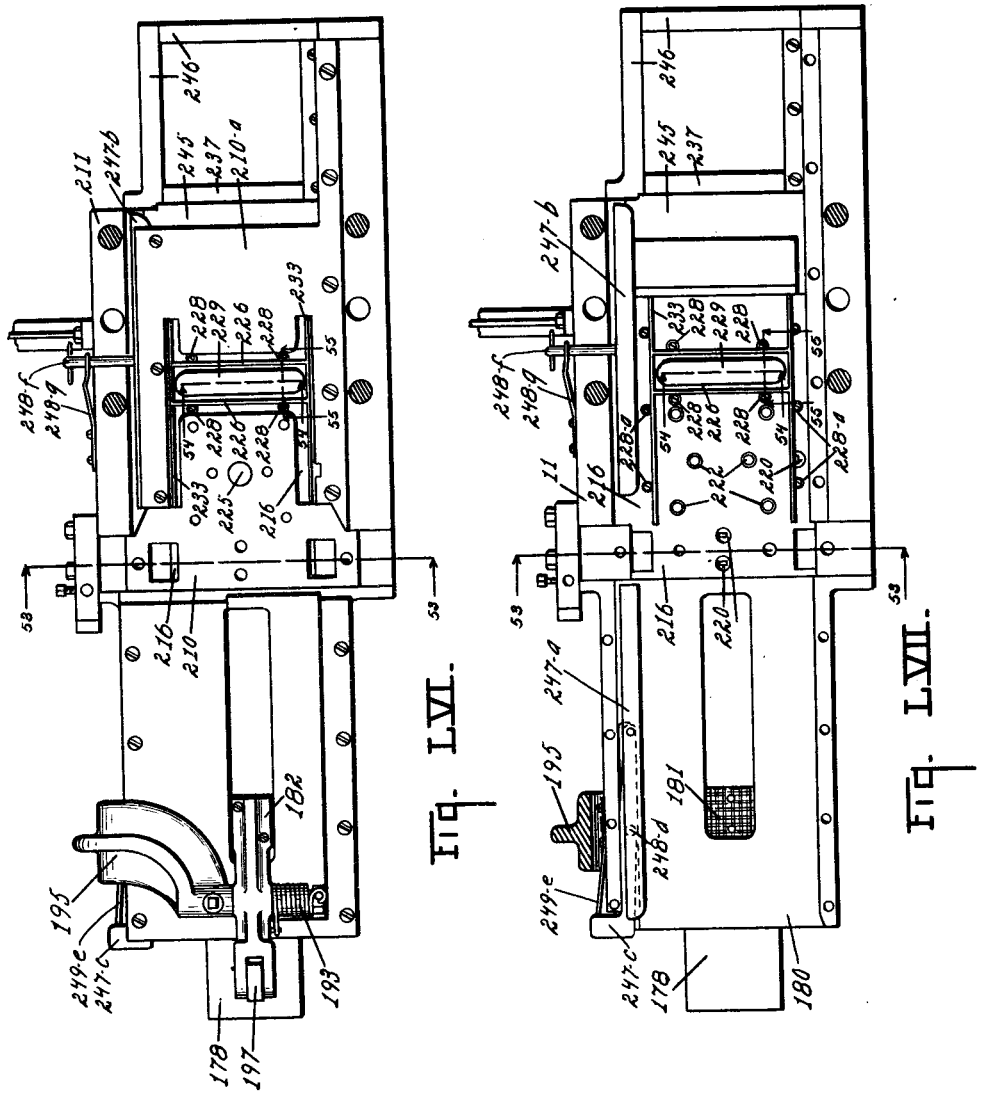

A. S. HOWELL.
BOX MAKING MACHINE.
APPLICATION FILED FEB. 11, 1915.
1,171,613.
Patented Feb. 15, 1916.
29 SHEETS—SHEET 26.
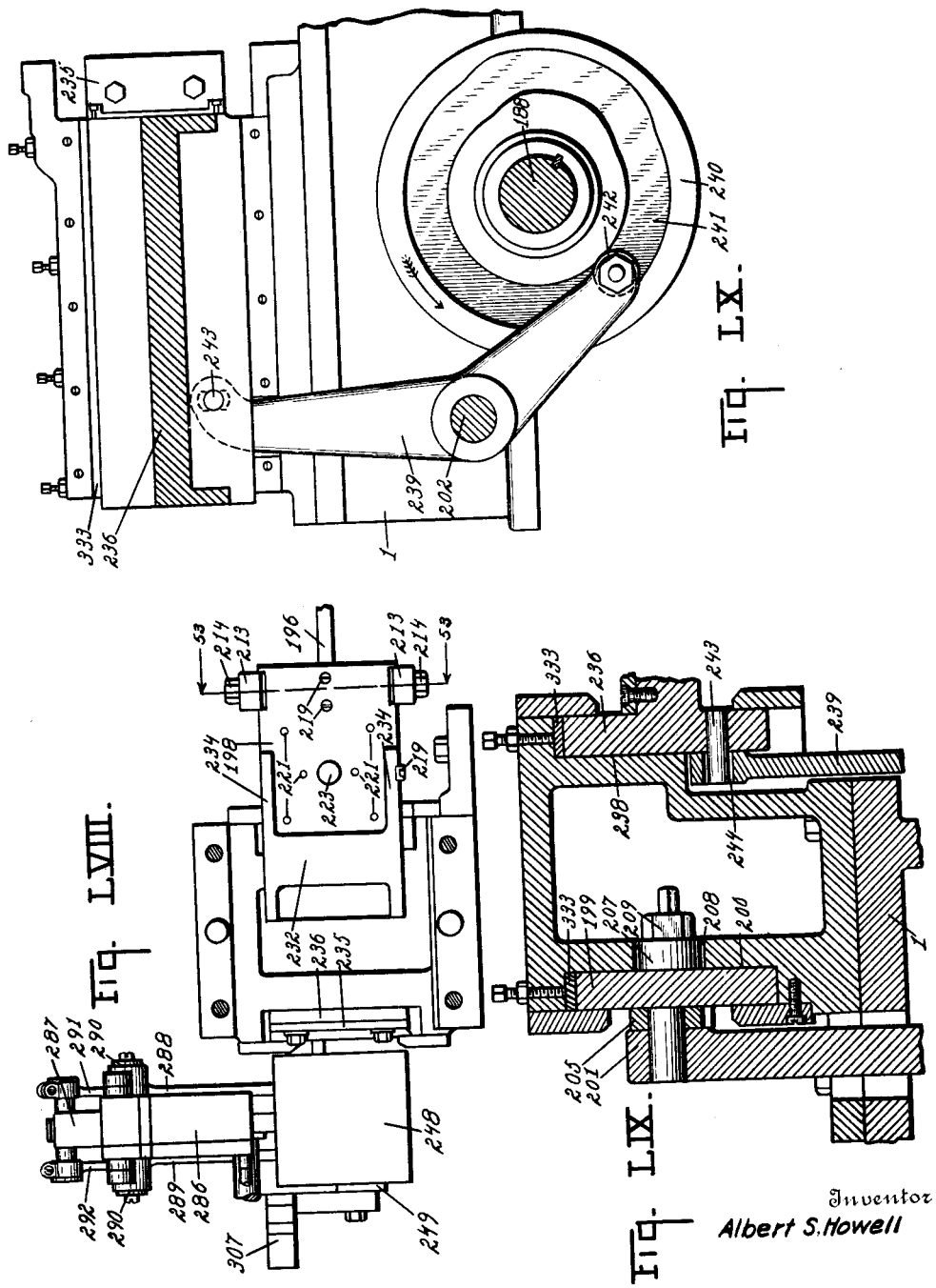
Inventor
Albert S. Howell
Witnesses
By Chappell Earl
Attorneys

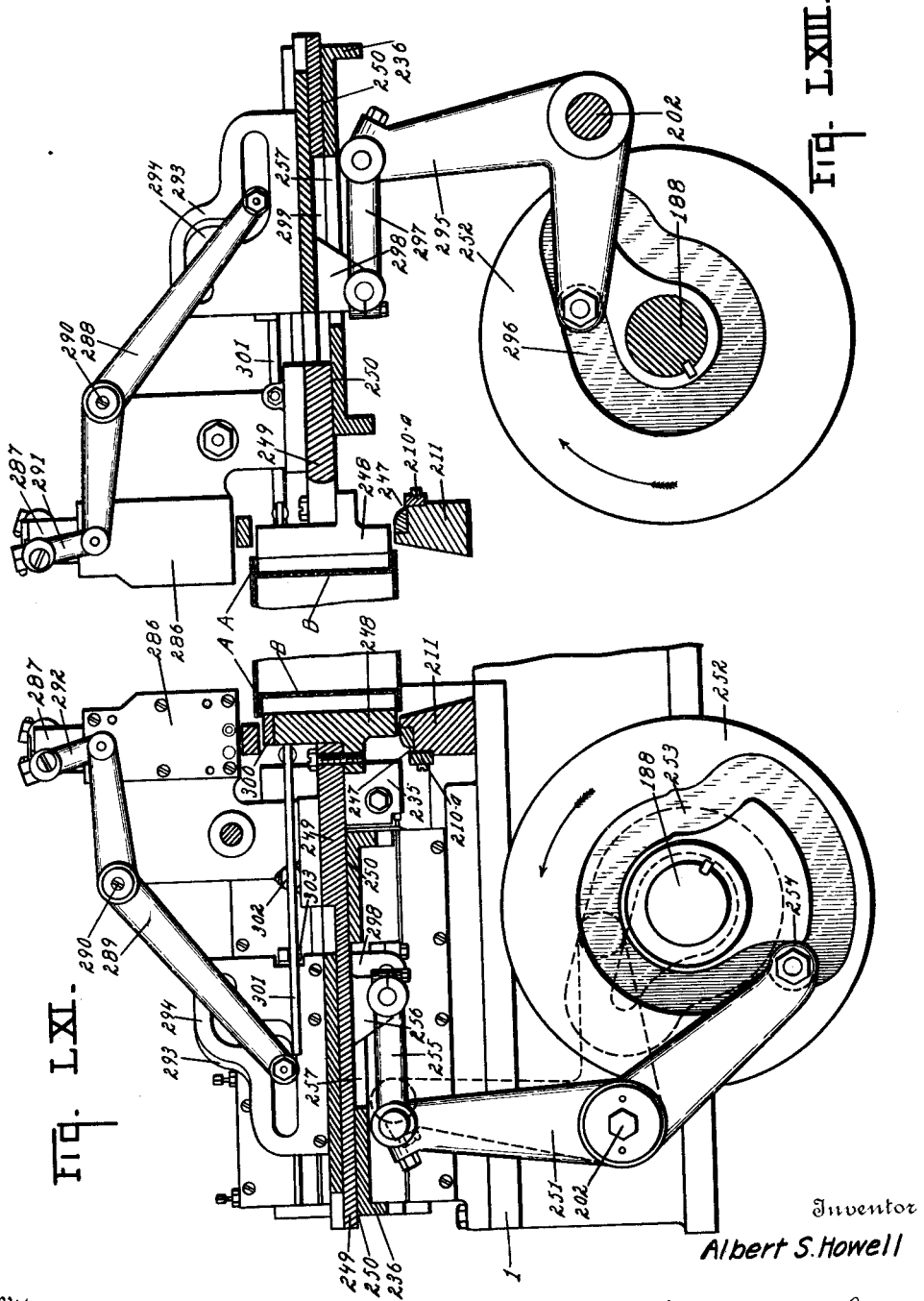

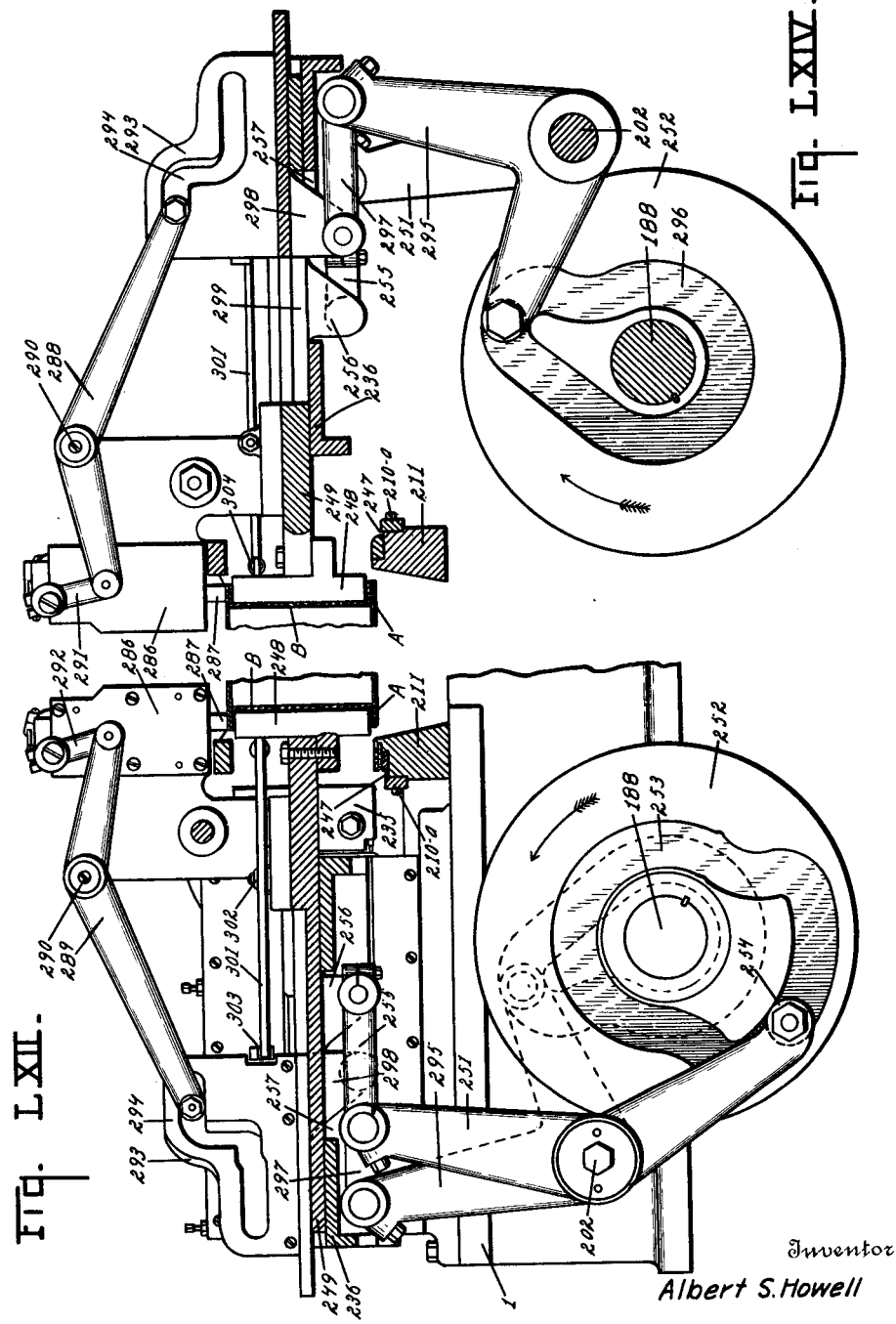

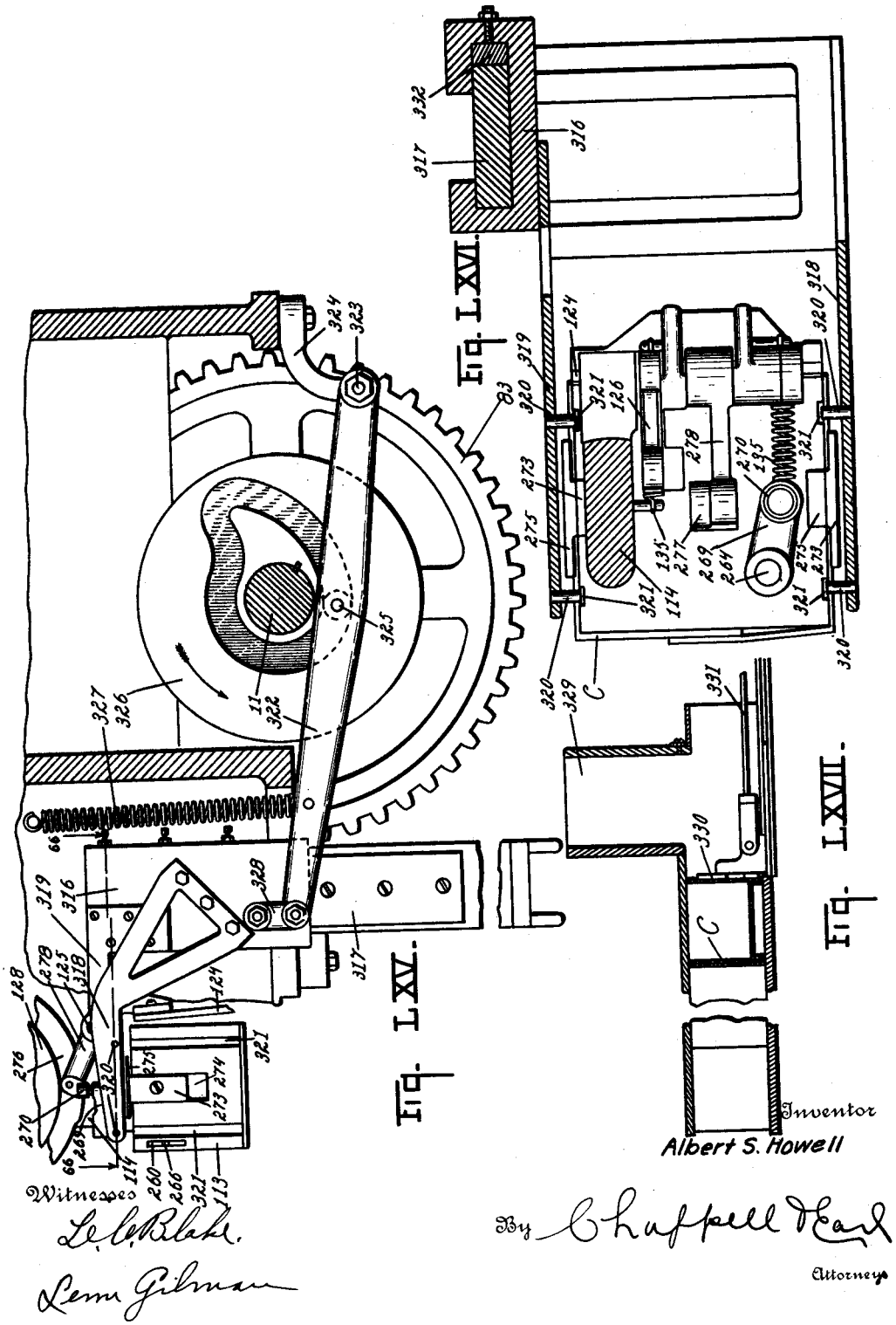

UNITED STATES PATENT OFFICE.

ALBERT S. HOWELL, OF CHICAGO, ILLINOIS, ASSIGNOR TO SANITARY PACKAGE COMPANY, OF KALAMAZOO, MICHIGAN.

BOX-MAKING MACHINE.

1,171,613.   Specification of Letters Patent.   Patented Feb. 15, 1916.

Application filed February 11, 1915.   Serial No. 7,528.

*To all whom it may concern:*

Be it known that I, ALBERT S. HOWELL, a citizen of the United States, residing at Chicago, Illinois, have invented certain new and useful Improvements in Box-Making Machines, of which the following is a specification.

This invention relates to improvements in box making machines.

The main objects of this invention are: First, to provide an improved automatic box making machine. Second, to provide an improved box making machine in which the bodies of boxes are formed from one roll of paper or paper board and the bottoms from another, the bodies of the boxes being blanked, erected, and stapled, the bottoms blanked, assembled in the bodies and stapled thereto. Third, to provide in a box making machine an improved feeding and blank forming means for the box bodies. Fourth, to provide in a box making machine an improved feeding and blank forming means for the box machine. Fifth, to provide in a box machine an improved means for assembling the bottoms and sides. Sixth, to provide an improved box making machine which is of large capacity, is entirely automatic, and one which is not likely to get out of repair in use.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I, Sheet 1, is a top plan view of my improved box machine, the stock rolls for the bodies and bottoms being omitted, the webs of the material being broken away. Fig. II. Sheet 2, is a front elevation, the stock roll being omitted. Fig. III, Sheet 3, is a left hand elevation, or an elevation looking from the left of Fig. II. Fig. IV, Sheet 4, is a rear elevation. Fig. V, Sheet 5, is a right hand elevation or an elevation looking from the right of Fig. II. Fig. VI, Sheet 6, is a bottom view, the legs being shown in section. Fig. VII, Sheet 6, is a section, showing details of the drive, taken on a line corresponding to line 7—7 of Figs. VI and IX. Fig. VIII, Sheet 7, is an enlarged detail plan view, partially in section, on a line corresponding to line 8—8 of Figs. II, III, IX, and X, showing details of the feeding and blank forming means. Fig. IX, Sheet 8, is an enlarged detail vertical section showing further details of the blank forming means, taken on a line corresponding to lines 9—9 of Figs I, III, V, VI, VIII, and X. Fig. X, Sheet 9, is an enlarged detail vertical longitudinal section showing details of the feed and blank forming means, taken on a line corresponding to lines 10—10 of Figs. I, II, VI, VIII and IX. Fig. XI, Sheet 10, is a sectional view on a line corresponding to lines 11—11 of Figs. III, IX, X and XII, showing the stripper plate and its supports. Fig. XII, Sheet 10, is an enlarged detail vertical section on a line corresponding to lines 12—12 of Figs. I, II, IX and XI, showing further details of the stripper plate and blank forming mechanism. Fig. XIII, Sheet 10, is an enlarged detail side view of parts of the feed mechanism, parts being sectioned to better illustrate the details. Fig. XIV, Sheet 10, is an enlarged detail section on a line corresponding to line 14—14 of Fig. VIII, showing still further details of the feed means. Fig. XV, Sheet 10, is a detail section on a line corresponding to lines 15—15 of Figs. I, II, and VIII, showing details of the blank scoring wheels. Fig. XVI, Sheet 10, is an enlarged top plan view of the stock alining means, parts being sectioned to better disclose structural details. Fig. XVII, Sheet 10, is an enlarged detail side elevation of the scoring wheel release means. Fig. XVIII, Sheet 11, is an enlarged detail section on lines corresponding to lines 18—18 of Figs. VI and IX, showing details of the punch actuating means. Fig. XIX, Sheet 11, is a detail longitudinal section on lines corresponding to lines 19—19 of Figs. I, II, VI and VIII, showing the actuating means for the blank feed. Fig. XX, Sheet 11, is a detail transverse longitudinal section taken on lines 20—20 of Figs. I and VIII, showing details of the blank feeding and releasing means, the grip or clutch being shown in its released position. Fig. XXI, Sheet 11, is a detail section similar to that of Fig. XX, showing the blank clamping or gripping means in its blank engaging position. Fig. XXI^A, Sheet 11, is a detail section on a line corresponding to line 21^A—21^A of Fig. XXI, showing details of the jaw actuating means. Fig. XXII, Sheet 11, is a detail vertical section on lines corresponding to lines 22—22 of Figs. I, VIII, XX, and XXI, showing further details of the blank feed mechanism. Fig. XXIII, Sheet 12, is an enlarged detail side elevation showing the box body forming and stapling means and bottom and body assembling, parts of the wire feed means for the bottom stapler being omitted. Fig. XXIV, Sheet 13, is an enlarged detail vertical transverse section on lines corresponding to lines 24—24 of Figs. I, V, and VI, showing details of the body forming turret and wire feeding means, and also details of the stapling means. Fig. XXV, Sheet 14, is a detail sectional view on lines corresponding to lines 25—25 of Figs. I, IV, VI and XXIV, showing details of the actuating means for the body forming mechanism. Fig. XXVI, Sheet 14, is a detail vertical longitudinal section on a line corresponding to line 26—26 of Fig. XXIV, of the Geneva stop actuating means for the box forming turret. Fig. XXVII, Sheet 14, is a detail vertical longitudinal view, partially in section, taken on a line corresponding to line 27—27 of Fig. XXIV, showing details of the turret. Fig. XXVIII, Sheet 14, is a detail sectional view on lines corresponding to lines 28—28 of Figs. I, III, XXIII, and XXVII, showing further details of the turret and box forming mechanism carried thereby. Fig. XXIX, Sheet 15, is a detail sectional view on a line corresponding to line 29—29 of Fig. XXVIII, showing the clamp for holding the box upon the forms of the turret and the releasing cam therefor. Fig. XXX, Sheet 15, is a detail view, partially in section, on lines corresponding to lines 30—30 of Figs. III, and XXIII, showing further details of the box forming mechanism. Fig. XXXI, Sheet 15, is a detail view, showing one of the actuating cams for the box body forming means, taken on lines corresponding to lines 31—31 of Figs. III, XXIII, XXIV and XXXVII. Fig. XXXII, Sheet 15, is a side view of one of the forms, with parts removed, showing details of the staple bending means. Fig. XXXIII, Sheet 16, is a sectional view of one of the box forms, taken on lines corresponding to lines 33—33 of Figs. XXXII, XXXIV, and XXXVI, showing further details of the stapling means. Fig. XXXIV, Sheet 16, is a detail sectional view through one of the box forms, taken on lines corresponding to lines 34—34 of Figs. XXXII, XXXIII, and XXXV, showing further details of the stapling means. Fig. XXXV, Sheet 16, is a detail longitudinal section through one of the box forms, taken on lines corresponding to lines 35—35 of Figs. XXXIII and XXXIV, showing details of the means by which the box is partially moved from the forms to receive the bottom. Fig. XXXVI, Sheet 16, is a detail sectional view, taken on a line corresponding to line 36—36 of Fig. XXXII, showing further details of the stapling means. Fig. XXXVII, Sheet 17, is a rear perspective of the left hand side of the machine, showing the box form, turret and forming means and the stapling mechanism and driving connections therefor. Fig. XXXVIII, Sheet 18, is a rear perspective of the right hand side of the machine, showing the bottom forming and feeding mechanism and further details of the stapling mechanism. Fig. XXXIX, Sheet 19, is a side elevation of the body stapler head and actuating means, certain parts being shown in sections. Fig. XL, Sheet 19, is a detail side elevation of certain of the parts shown in Fig. XXXIX, the stapling head being shown in full lines in its staple setting position, and by dotted lines in its open position. Fig. XLI, Sheet 20, is a detail section, taken on lines corresponding to lines 41—41 of Figs. I, II, IV, and XXIV, showing further details of the stapler actuating means. Fig. XLII, Sheet 20, is a detail section on lines corresponding to lines 42—42 of Figs. I, II, IV, and XXIV, showing still further details of the stapler actuating mechanism. Fig. XLIII, Sheet 20, is a detail section, on a line corresponding to line 43—43 of Fig. XXXVII, showing details of the staple head actuating mechanism. Fig. XLIV, Sheet 20, is a detail section on lines corresponding to lines 44—44 of Figs. I, III, V, XXIII, XXXVIII, XXXIX and XLI. Fig. XLV, Sheet 21, is a detail section on lines corresponding to lines 45—45 of Figs. I, III, V and XXIII, showing details of the bottom feeding and forming means, certain parts being omitted to better disclose the parts shown. Fig. XLVI, Sheet 21, is a detail plan view of the wire feeding means for the bottom stapler. Fig. XLVII, Sheet 12, is a detail section on lines corresponding to lines 47—47 of Figs. III, IV, V, XXIII and XXXVIII, showing details of the stapling wire tension means for the box body stapler. Fig. XLVIII, Sheet 12, is a detail section on a line corresponding to line 48—48 of Fig. XLVII. Fig. XLIX, Sheet 22, is a detail section on lines corresponding to lines 49—49 of Figs. I, IV, VI, and XLV, showing details of the bottom feeding and scoring means. Fig. L, Sheet 23, is an enlarged detail horizontal section taken on lines corresponding to lines 50—50 of Figs. XXIII, and XLIX, showing further details of the bottom feed and forming mechanism. Fig. LI, Sheet 22, is a detail section on a line corresponding to line 51—51 of Fig. L, showing details of the adjustment for the bottom feed clamp and punching and scoring members. Fig. LII, Sheet 24, is a detail section corresponding to Fig. L, enlarged to better disclose the structure of certain parts. Fig. LIII, Sheet 24, is an enlarged detail section on lines corresponding to lines 53—53 of Figs. I, IV, XXXVIII, LVI, LVII, and LVIII, showing the arrangement of the bottom punches. Fig. LIV, Sheet 24, is an enlarged detail section taken on lines corresponding to lines 54—54 of Figs. L, LII, LV, LVI, and LVII, showing the stripper plate for the bottom punches and scoring knife. Fig. LV, Sheet 24, is an enlarged detail section, taken on lines corresponding to lines 55—55 of Figs. LIV, LVI, and LVII, showing details of the bottom scoring knife. Fig. LVI, Sheet 25, is a detail side elevation showing the paper way and the relation of the bottom forming mechanism thereto. Fig. LVII, Sheet 25, is a similar detail view with the stripper plate removed and other parts sectioned to show further structural details. Fig. LVIII, Sheet 26, is a detail section taken on lines 58—58 of Figs. XXXVII, XXXVIII, XLIX, L, and LII, showing details of the bottom blank punches and of the plunger for delivering the bottom to the body. Fig. LIX, Sheet 26, is an enlarged detail section, taken on lines corresponding to lines 59—59 of Figs. I, V, XXXVIII and XLIX, showing details of the means for actuating the bottom blank severing knife and also of the means for actuating the bottom blank punching and scoring clamp. Fig. LX, Sheet 26, is an enlarged detail section taken on lines corresponding to lines 60—60 of Figs. IV, XLV, and L, showing further details of the severing knife actuating means. Fig. LXI, Sheet 27, is a detail side elevation of the rear end of the left hand side of the machine, parts being shown in vertical longitudinal section, showing details of the means for delivering the bottom to the box body. Fig. LXII, Sheet 28, is a detail elevation, parts being in section, of the parts shown in Fig. LXI, in their bottom delivery position. Fig. LXIII, Sheet 27, is a detail view showing details of the stapling head actuating means, certain parts being shown in vertical longitudinal section. Fig. LXIV, Sheet 28, is a detail view, similar to that of Fig. LXIII, with the parts shown in their actuated position. Fig. LXV, Sheet 29, is an enlarged detail section, taken on lines corresponding to lines 65—65 of Figs. II, and VI, showing the means for ejecting the finished boxes from the form. Fig. LXVI, Sheet 29, is a detail horizontal longitudinal section, on lines corresponding to lines 66—66 of Figs. III, XXIII, and LXV, showing further details of the box ejecting means. Fig. LXVII, Sheet 29, is a detail vertical longitudinal section, taken on lines corresponding to lines 67—67 of Figs. II, IV, and VI, showing details of the box delivery mechanism. Fig. LXVIII, Sheet 2, is a plan view of the box body blank. Fig. LXIX, Sheet 4, is a plan view of the box bottom blank.

In the drawing similar reference characters refer to similar parts throughout the several views, and the sectional views are taken looking in the direction of the little arrows at the ends of the section lines.

Referring to the drawing, 1 designates the main frame of the machine, which is supported upon suitable legs or pedestals 2. The paper 3 is delivered to the front end of the machine from a roll 4, the journal of which is supported on pairs of rollers 5 carried by a supplementary frame 6 projecting at the front end of the machine. The web of paper is delivered across the feed table 7. The feed table 7 is provided with forwardly projecting downwardly curved guide fingers 8, see Figs. I, and X.

The feed table 7 is mounted to reciprocate on the forwardly projecting arm-like way 10, see Fig. X. The feed table is provided with a slide 9 engaging the ways 10. The feed table is actuated from the main shaft 11 of the machine which is provided with an eccentric 12 connected by the rod 13 to the lever 14. The lever 14 is pivoted at 15 on the bracket 16 at the front of the machine. The lever is connected by the link 17 to the slide 9, see Fig. X, Sheet 9, where these parts are clearly shown.

The lever 14 is provided with spaced holes 18 for the pivot 15, the bracket being also provided with spaced pivot holes, the purpose being to determine the size of the box, the pivot being arranged in the bottom hole for the larger boxes and in the top hole for the smaller. The changing of the pivot regulates the stroke of the feed table, as will be readily understood.

To hold the web to the feed table I provide a plurality of spaced bars 19, which are mounted at their forward ends on the cross bar 20 and which in turn is supported by the spools 21 carried by the cross bar 22 on the front end of the slide way 10. The bars 19 rest upon the web and are connected by the cross bar 23, see Figs. I, VIII and X.

The paper is delivered by the feed table on to the die block 24 which is provided with the female die members 25. The die block 24 carries the shear bar 26, the shear bar being at the rear edge of the die block. To effectively guide the paper on to the die block the die block is provided with forwardly projecting fingers 27 spaced to receive between them the delivery fingers 28 on the rear end of the feed table, see Figs.

VIII and X. The reciprocating knife and punch bar or cross head 29 carries the punches 30 and the knife 31, the knife being arranged to coact with the shear bar 26, see Figs. IX and X. The punches 30 are adjustably retained in the bar 29 by means of the blocks 32, see Figs. IX and X. The bar 29 also carries the name die plate 33. The die stripper plate 34 is also carried by the bar 29. The stripper plate 34 mounted on or carried by the posts 35, supported to reciprocate in the bar 29 and is held yieldingly downward by the coiled springs 36. The posts are adjusted by the nuts 36', see Fig. XII, Sheet 10. The stripper plate is provided with holes 37 for the punches 30. On the down stroke of the bar 29 the stripper plate engages the material before the stroke is completed and the springs 36 yield during the completion of the stroke so that the material is held while acted upon by the punches and knife. On the up stroke the stripper plate is held down by the springs until after the punches and the knife are withdrawn from the blank. The stripper plate is notched at 38 to receive the marking die 33, see Figs. XI and XII. The bar 29 is reciprocated by the eccentrics 39 on the main driving shaft 11, see Figs. IX and XVIII, Sheets 8 and 11 respectively. The eccentric collars 40 are connected by the links 41 arranged through hollow uprights 42 on which the bar 29 is slidably mounted, the links being connected to the slide heads 43 of the bar by the pivots 44. The punchings from the dies are delivered by a chute 45 arranged, as shown in Figs. II and IX, below the holes 46. The reciprocation of the cross head or bar 29 also actuates the gripping jaws 47 which coact with jaws 48 carried by the rearwardly projecting arms or bars 49 at each side of the feed table. The movable jaws 47 are carried by the levers 50 pivotally mounted on the outer sides of the arms or bars 49 at 51. The jaws are actuated to their gripping position by the extension springs 52 which are connected to the levers 50 and to the arms 53 on the cross head or bar 29 and by the compression springs 54 which are carried by the rods 55 disposed through bosses 56 on the levers and supported by lugs 57 on the bars or arms 49 carried by the feed table. The jaws 47 are released by the downward movement of the cross head or bar 29 which is provided with forwardly projecting arms 58 engaging the rollers 59 on the levers. These arms 58 and the spring actuating connections described reciprocate the jaws with the feed table, the jaws being closed on the feed stroke of the feed table which occurs while the cross head or bar 29 is raised, retracting the knife and punches and permitting the web to be fed forward below the punches and knife. The return stroke of the feed table takes place while the jaws are held open by the arms 58 on the cross head and while the stock is clamped by the stripper plate 34. On the retracting stroke of the feed table, the stock or web being secured in its advanced position, the rotary scoring knives 60 are operated to score the blank along its folding lines. These scoring knives are best shown in Figs. VIII and XV, Sheets 7 and 10 respectively. The scoring knives are mounted on the rock shaft 61 journaled in the bearings 62 carried by the reciprocating feed table. These knives are disposed above the rearwardly projecting fingers 28 on the feed table on the under side of which are rollers 63 coacting with the knives, the fingers being provided with suitable openings to receive the rollers, see Fig. XV. In the structure illustrated, the outer scoring knives have double cutting edges, it being found of advantage to provide the box with double scores at the corresponding joints, while the inner pair have single cutting edges. The knives are carried by the clip blocks 64 mounted on the rock shaft, the blocks being split and clamped upon the shaft by means of the screws 65, see Fig. XV. To shift the knives to inoperative position I provide the rock shaft with an arm 66 at one end, which is slotted at 67 to receive the pin 68 of the releasing lever 69 which is pivoted at 70 on the feed table, see Fig. XVII. With the lever in the position shown in this figure the knives are in operative position. When the lever is shifted to swing the pin 68 to the other end of the slot 67 the rock shaft is actuated to raise the cutters to inoperative position.

To properly center the web of stock as it is carried forward to the punching dies and cutting knife I provide a guide bar 71 which is carried by the headed pins 72 slidably mounted on the brackets 73 on one side of the feed table, see Fig. XVI, Sheet 10. This guide bar is held yieldingly inward to engage the edge of the web by means of the springs 74 and 75, the springs 74 being mounted on the side of the bar to engage the bracket 73, while the spring 75 is mounted on the bracket 76 on the feed table with its free ends engaging the guide bar. To throw the guide bar to its inoperative position, which is of advantage in the starting of the web into the machine, I provide a lever 77 which is pivoted at 78 on the feed table and slotted at 79 to engage a pin 80 on the bar, as clearly appears in Fig. XVI, Sheet 10. This guide bar holds the web of paper with its opposite edge against the bar 81 on the opposite side of the feed table, see Fig. I. With the feed and blank forming mechanism thus arranged the paper is scored and delivered from a roll to the cutting and punching mechanism by which it is punched and cut into the blanks.

The main driving shaft 11 is connected to the pulley shaft 82 by means of the gear 83 and the pinion 84, see Figs. VI and VII, Sheet 6. The driving pulley 85 is connected to the shaft 82 by the clutch 86. This clutch is operated from the left hand side of the machine by the lever 87 for the shifting bar 88 supported in suitable slides 89, as shown in Fig. I. The details of the clutch are not shown or described as suitable clutches are well known. The shaft 82 is provided with a hand wheel 90 by means of which the machine may be operated as occasion requires.

The blanks are fed to the box forms by the blank feed or delivery carriage or slide 91 provided with a clamping jaw 92, see Figs. I, VIII, XX, and XXI. The blank delivery carriage or slide 91 is mounted on the slide 93 and the slide way 94 for reciprocatory movement, see Figs. VIII and XX. The blank feed or delivery carriage 91 is actuated from the cam 95 on the main driving shaft 11, the cam acting upon one arm of the lever 96, which is pivoted at 97 to the main frame. The link 98 is connected to the lever at 99 and to the slide rod at 100. The slide rod is supported in bearings 101, best shown in Fig. VIII. The jaw 92 is actuated to its engaging position by the cam finger 102 carried by an arm 103 on the cross head 29. This arm 103 engages with the roller 104 on the jaw actuating lever 105, which is pivoted at 106 on the blank feed carriage 91. This lever 105 is provided with a pin 107 held yieldingly in engagement with the rear end of the jaw by the spring 108 seated in a suitable socket in the lever, as is clearly shown in Figs. XX and XXI, the jaw being pivoted at 109. The oscillation of the lever rocks the jaw on its pivots to open and close it, the spring 108 holding it in its open and closed position and also actuating it with a snap-like movement. The jaw is opened by the cam finger 110, which engages with the roller 104 on the up stroke of the cross head 29. The rear end of the jaw 92 is forked to embrace the forward end of the actuating lever. The actuating lever 105 is chambered to receive the pin 107 which engages the rear end of the jaw. The pin 107 is yieldingly held forward by the spring 108. The movement of the pin is limited by the stop 111 arranged in the slot 112. As the blanks are severed by the shears or knife they drop on to the inclined fingers 91$^c$ and are carried forward on the extension or bar 91$^a$ against the stop 91$^b$, see Fig. 1, Sheet 1, and Fig. VIII, Sheet 7. With this arrangement of parts the body blanks A, see Fig. LXVIII, Sheet 2, are fed to the rectangular forms 113, which are mounted on the revolving turret 114, the form of the turret being shown in Fig. XXVII, Sheet 14, the turret with its forms being shown in side elevation in Fig. XXIII, Sheet 12. The turret is operated with a step by step movement to bring the forms into position to receive the blanks by the Geneva stop mechanism in Figs. XXIV and XXVI, Sheets 13 and 14 respectively. The turret is mounted on the hollow shaft 115, it being secured to the shaft by the bolts 116 engaging notches in the sides of the shaft, see Fig. XXVII, Sheet 14. The Geneva stop member 117 is secured to the shaft 115 and is driven with a step by step movement from the coacting Geneva stop member 118 on the shaft 119 disposed parallel to the shaft 115. As the action of this Geneva stop mechanism is well understood it is not described with further detail herein. A housing 123 is provided for the Geneva stop mechanism. The shaft 119 is connected to the gear 83 on the shaft 11 by the gear 120, see Figs. VI and XXIV. The main frame is provided with bearings 121 for the shaft 115 and with bearings 122 for the shaft 119. By this driving connection the turret is driven in synchronism with the blank feeding mechanism.

As the blanks are fed across the forms 113 by the blank feed mechanism described, they are engaged by the form clamps 124 pivoted at 125 on the arms of the turret. The clamp members have projecting arms 126 provided with rollers 127 which are engaged by the cam 128 on the shaft 129 arranged longitudinally through the turret shaft 115. The cam projection 130 of the cam 128 has a considerable length as it releases the form clamp at the discharge position and holds it in its open position until after the blank has been delivered to the form or the form swings to position to receive the blank. The cam shaft 129 is given an oscillating movement by the cam 131, see Figs. XXIV and XXV, Sheets 13 and 14 respectively, the cam 131 being mounted on the shaft 119 and acting on the arm 132 on the shaft 129, the arm being provided with a roller 133 engaging the cam groove 134. This cam 131 is so shaped as to properly time the actuations of the form clamps actuating cam described. The form clamp is actuated to its engaging position by the coiled springs 135, see Fig. XXIX, Sheet 15. With the blank clamped by one side to a form the rotation of the turret carries the form between the folders 136, which are oppositely disposed so that the forms swing between them. The blanks are given a preliminary fold by the arms 136$^a$ between which they are carried as the turret revolves to bring them between the folders. These folders are pivotally mounted at 137 on the arm 138 projecting above the turret. These folders 136 are swung open to receive the form and close upon the blank to fold the sides against the form and are provided with flanges 139 adapted to fold the overlapping or flap portions of the blank so as to position the same for the stapling. The folders are closed by the spring 140 connected at its ends to the folders and are opened by the arm 141 provided with a wedge-like cam 142, which swings between the rollers 143 on the inwardly projecting arms 144 on the folders, see Fig. III, Sheet 15. This arm 141 is carried by the arm 145 carrying the stapling head 146, the arm 141 being arranged so that as the stapling arm 145 is swung out the arm 141 is swung to position to open the folders 136 and when the stapling arm is actuated on its work stroke the arm 141 swings out of engagement with the folder members 136 allowing the spring 140 to close the folders and fold the lapping portions in position to receive the staple and clamp the blank to the form while the stapling takes place. The stapling head arm 145 is carried by the rock shaft 147 journaled in the bracket 148 on the main frame, the shaft 147 being provided with an arm 149 having a cam groove 150 therein. The arm 149 is actuated from an arm 151 having a roller 152 engaging the cam slot 150, the arm 151 being carried by the shaft 153 which has an arm 154 on its opposite end connected by the pitman 155 to the crank disk 156 on the shaft 119, the pitman being connected to the disk by the crank pin 157, see Figs. III, XIII, XXIV, and XLIV. This secures the proper timing of the stapling head and blank folders with the turret.

The staple hammers or setters are mounted to reciprocate in the stapling head 146 and are operated by means of the levers 159 and 160 pivoted at 161 on the staple head arm 145. These levers 159 and 160 are actuated by cams 162 and 163 on the cam member 168 mounted to oscillate on the shaft 147. The oscillation of the cams is effected from an arm 163ª loosely mounted on the rock shaft 153ª, the arm 163ª being connected by the link 164 to the arm 165 on the member 168. The arm 163ª is actuated by the coiled spring 166 which is connected at one end to the arm 163ª and at the other to the bracket 148. The arm 163ª is returned against the tension of its spring by the arm 154 which is adapted to engage the pin 167 on the arm 163ª, see Figs. XXIII and XLI, Sheets 12 and 20. The cam member 168 is also provided with a cam groove 169 for actuating the wire feed. The wire feed carriage, designated by the numeral 170, is mounted on rod-like ways 171 and 172 and is provided with suitable feeding devices designated generally by the numeral 173. As the details of the wire feed form no part of my invention they are not further described herein. The wire feed carriage is reciprocated by means of the lever 174 which is provided with a roller engaging the cam groove 169, the lever being mounted on the arm 175, see Fig. XXIV, Sheet 13. The wire is carried by a pair of spools 176. See Fig. I, Sheet 1.

The staple setters are adapted to form the staples from the wire which is fed to them by the feed mechanism referred to. The staples are forced through the box and their ends project into the hollow forms in position to be engaged by the clenching jaws 260 arranged to slide in suitable ways provided therefor on the forms. See Figs. XXIX–XXXVI inclusive, Sheets 15 and 16. These clenching jaws are provided with racks 261 meshing with the pinion 262 which causes their simultaneous operation. The jaws are actuated by the arm 263 on the rock shaft 264, the arm engaging a slot 265 in one of the jaws. The outward movement of the jaws is limited by the stops 266, see Fig. XXXII, Sheet 15. The rock shaft 264 is journaled in the wall of the form and in the bearing 267 within the form. See Fig. XXXIII, Sheet 16. The rock shaft is actuated to actuate the clenching jaws by means of the cam 268 mounted on the cam 276 on the shaft 129, the cam 268 being positioned so that the jaws are actuated after the staples are driven. The rock shaft 264 is provided with an arm 269 having a roller 270 thereon coacting with the cam 268, see Figs. XXXI, XXXII and XXXIII, Sheets 15 and 16. The jaws are returned to their open or initial position by the coiled spring 271 on the rock shaft, see Fig. XXXIII, Sheet 16. After the stapling takes place the stapling heads are retracted and at the same time the folders 136 are opened by the cam 142 on the arm 141 swinging between the rollers 143, see Fig. XXX, Sheet 15.

The turret is, as stated, rotated with a step by step movement and its movement takes place while the stapler head is retracted and these folders are open. The next step of the turret brings the box body in position to receive the bottom. To adapt the box body to receive the bottom it is partially pushed from the form. This is accomplished by the push bar 272 having end pieces 273 arranged in slots 274 in the walls of the form, the end pieces being provided with rests 275 which engage the edges of the box, see Fig. XXXV, Sheet 16. In this figure the push bar is shown in its actuated position and the box bottom has been inserted. The push bar is actuated by the cam 276, see Fig. XXIII, Sheet 12, and Fig. XXXV, Sheet 16, which cam acts on a roller 277 carried by the arm 278 pivoted on the shaft 125. The push bar is provided with an adjusting screw 279 having a lock nut 280 thereon. The push bar is returned by the springs 281 and 282 supported by the telescoping members 283 and 284, the member 283 being secured to the push bar and the member 284 to the end of the form, see Fig. XXXV, Sheet 16. The bottom forming mechanism will now be described.

The stock 177 for the bottom is fed from a roll or spool of paper board, not shown, positioned at the right hand side of the machine, the stock being supported so that it is fed in a vertical position, see Fig. I, Sheet 1. The bottom stock web is fed to the machine by the reciprocating feed slide 178 mounted in a suitable way 179 in the horizontal frame piece 180, the frame piece being disposed transversely of the frame and toward the rear end thereof. The bottom feed slide 178 has a fixed jaw 181 and a pivoted jaw 182, see Fig. L, Sheet 23. The web of stock is fed through a slot-like guide 183 to these jaws. The feed slide is oscillated by an arm 184 on the rock shaft 185, the arm being connected to the slide by means of a link 186. The rock shaft is actuated by the crank 187 on the shaft 188 which is connected by the pitman 189 to the arm 190 on the shaft 185. The pitman is connected to the crank and the arm by universal joints, designated generally by the numeral 191, see Fig. V, Sheet 5; Fig. XXXVIII, Sheet 18; Fig. XLV, Sheet 21; and Fig. L, Sheet 23. The shaft 188 is connected by the gear 192 to the gear 120 on the shaft 119, see the bottom view Fig. VI, Sheet 6. This secures the driving of the bottom stock feed in proper synchronism with the other parts of the machine. The movable jaw is actuated to engage the paper by the coiled spring 193 on the pivot 194 of the jaw, the pivot being carried by a yoke-shaped bracket 195 embracing the top of the frame piece 180 by which the slide is carried, see Fig. XXXVIII, Sheet 18. The jaw is released by the trip arm 196 which engages the roller 197 on the tail end of the jaw, see Fig. L, Sheet 23. This trip arm is carried by the die block 198 which in turn is carried by the die block carriage or slide 199 mounted in the way 200, see Fig. V, Sheet 5; Fig. XXXVIII, Sheet 18; Fig. XLIX, Sheet 22, and Fig. L, Sheet 23. The die block carriage or slide 199 is reciprocated by the lever 201 pivoted at 202 and connected by the link or pitman 203 to the eccentric 204 on the shaft 119, see Fig. VI, Sheet 6, and Fig. XLIX, Sheet 22. The lever is connected to the die slide or carriage by the link 205. The link is adjustably connected to the slide or carriage by means of the eccentric 206 which is mounted in the carriage and provided with a clamping washer 207 and nut 209. The way is slotted at 208 to receive the stem of the eccentric and its clamping washer and nut, see Fig. L, Sheet 23.

The stock web is fed under a stripper plate 210 which is mounted on a fixed part 211 of the frame, the plate being secured by the screws 212, see Figs. L, LII and LIII, Sheets 23 and 24. The die plate 198 is provided with two punches 213 which form the corner notches $b$ in the bottom blank B, see Fig. LXIX, Sheet 4. The punches are adjustably secured by the screws 214 engaging slots 215 in the punches, see Fig. LIII, Sheet 24. A coacting die member 216 is secured to the frame piece 211 by means of the screws 217. To assist in supporting the die member 216 I provide a pair of pins 218, see Fig. LII, Sheet 24. The holes $b'$ in the bottom flaps $b'''$ are formed by the punches 219 carried by the die block 198. These punches coact with female dies 220 in the die member 216, see Fig. LII, Sheet 24. The ventilating holes $b''''$ in the bottom are formed by punches 221 carried by the die block 198, see Fig. LVIII, Sheet 26. The die member 216 is provided with coacting female dies 222, see Fig. LVII, Sheet 25.

The stock is fed on to the die plates 216 and beneath the stripper plates 210 and 210$^a$. To assist in holding the stock while acted upon by the punches I provide a plunger 223 mounted in the die block and held yieldingly forward by the coiled spring 224, see Figs. L and LII, Sheets 23 and 24, and Fig. XLIX, Sheet 22. The stripper plate 210 is provided with an opening 225 through which the plunger engages the stock. The plunger is held yieldingly forward so that it engages the stock before it is acted upon by the punches and holds it while it is acted upon by the punches.

To facilitate the folding of the bottom blank it is scored along the line joining the flaps $b'''$ with the body portion of the bottom, see Fig. LXIX, Sheet 4. This scoring is effected by the vertically disposed blades 226 which are seated in grooves 227 in the face of the die plate and retained therein by the wedges 228, the blades being secured so that their edges project slightly beyond the face of the die plate. The blades 226 are arranged in pairs, the blanks being severed by the knife between the scores formed by these blades. A stripper bar 229 is carried by the pins 230 and yieldingly supported by the blade spring 231, see Fig. LIV, Sheet 25. This stripper bar lifts the stock from the blades so that it may be fed across the same. The die block 198 is provided with a rib 232 which forces the stock on to the blades 226. The die plate 216 is also provided with scoring knives 233 which form the other scores for the bottom flaps. These scoring knives 233 are horizontally disposed in the die plate and retained therein by wedges 228$^a$. As the stock is fed longitudinally of these scoring knives they do not require any stripper plate. The die block is provided with ribs 234 which coact with the horizontal scoring knives 233, see Fig. XLIX, Sheet 22, and Fig. LVIII, Sheet 26. Two of the punches 219 are arranged so that the stock is severed between the holes formed thereby. The stock is held by the guiding bars 247ᵃ and 247ᵇ arranged to engage the upper edges of the web of stock as it passes through the punching and forming die described. The bar 247ᵃ is carried by the arm 247ᶜ pivoted at 248ᵈ and acted upon by the spring 249ᵉ. The bar 247ᵇ is carried by a rod 248ᶠ mounted on the spring 248ᵍ, see Figs. LVI and LVII, Sheet 25. The punched and scored blanks are severed or cut off by the knife 235 on the knife carriage 236. This knife coacts with the shear bar 237, see Figs. L, and LII, Sheets 23 and 24 respectively. The knife carriage 236 is arranged in a horizontal way 238 corresponding to the way 200 for the die block carriage. This knife carriage or slide 236 is reciprocated by the lever 239 pivoted at 202. The lever is oscillated by the cam 240 having a cam groove 241 in its face in which the roller 242 on the lever travels. The cam 240 is on the shaft 188. The lever is connected to the knife carriage by the pin 243, the lever being slotted at 244 to receive the pin and allow for the oscillation of the lever. See Figs. LIX and LX, Sheet 26.

To guide the stock across the shear bar 237 I provide a supporting spring 245 which yields with the knife but returns the stock so that on the next feed stroke it is guided across the shear bar. With this arrangement of parts the bottom blanks are automatically punched, scored, and severed and delivered to the bottom assembling and stapling mechanism. The severed blanks are supported by the frame-like holder 246, the lower edges of the severed blanks engaging the groove 247 at the bottom of the holder with the flaps of the bottom overlapping the sides of the holder so that when the plunger 248 moves through the holder the flaps are turned backward and the bottom carried into the body which has been partially pushed from the forms to receive the same by the mechanism described. See Figs. LXI and LXIII, Sheet 27, in which the parts are shown with the plunger partially retracted, the bottom being shown after it has been forced into the body of the box.

The plunger 248 is mounted on a carriage 249 reciprocating in a way 250 on the knife carriage 236. See Fig. L, Sheet 23; Figs. LVIII and LIX, Sheet 27; Figs. LXII and LXIV, Sheet 28. The plunger is actuated from the lever 251 pivoted on the shaft 202 to be acted upon by the cam member 252 which has a cam groove 253 on one face coacting with the roller 254, see Fig. LXI, Sheet 27, the same parts being shown in a different position in Fig. LXII, Sheet 28. The lever 251 is connected by the link 255 to an arm 256 depending through the slot 257 in the plunger way. The cam member 252 is mounted on the shaft 188 so that the plunger is actuated in synchronism with the other parts of the machine described.

The stapler head 286 is carried by the plunger carriage 249 to overhang the plunger, as shown in Figs. LXI–LXIV inclusive, Sheets 27 and 28. The staple forming and setting mechanism, designated generally by the numeral 287, is mounted in the stapler head 286 and is actuated by a pair of levers 288 and 289 pivoted at 290 on the stapler head bracket and connected to the staple forming and setting mechanism by the links 291 and 292 respectively. As the details of the staple forming and setting or driving mechanism form no part of my present invention they are not further described herein. The levers 288 and 289 are actuated by the cams 293 and 294 respectively, see Fig. XXXVII, Sheet 17, and Figs. LXI–LXIV, Sheets 27 and 28. The cams 293 and 294 are slidably mounted on the plunger carriage 249 and are actuated from the lever 295 mounted on the shaft 202 to coact with the cam groove 296 on the cam member 252 described. The lever 295 is connected to the cams 293 and 294 by the link 297. The link 297 is connected to an arm 298 projecting through a slot 299 in the plunger carriage 249 and the slot 257 in the plunger carriage way. The stapler clencher, designated generally by the numeral 300, see Fig. L, Sheet 23 and Fig. LXI, Sheet 27, is actuated by the lever 301 mounted at 302 on the plunger carriage. This lever is actuated by the roller 303 on the member carrying the cams 293 and 294. The lever 301 is returned by the coiled spring 304, see Fig. L, Sheet 23. Details of the staple clencher are not shown as they form no part of my present invention.

The wire feed for the bottom stapler is substantially the same as that for the body staplers and comprises the wire spool 305 from which the wire is delivered to the wire feed device 173, see Figs. XXXVII and XXXVIII, Sheets 17 and 18, and Figs. XLV and XLVI, Sheet 20, through the tension tube 306. The feed device 173 for the bottom stapler is actuated by the cam 307 mounted on the knife carriage 236, see Fig. XXXVII, Sheet 17, to engage the roller 308 on the wire feed device carriage 170.

The tension device is shown in detail in Figs. XLVII and XLVIII, Sheet 12, and consists of the guide tube 306 mounted in a support 309 rocking in the sleeve 310 on the arm 311. On the sleeve 310 is a tension spring 312, one end of which is secured to the support 309 and the other to a collar 313 on the arm 311. As the wire is drawn forward by the feed device this tube rocks downwardly against the tension of its spring, thus holding the wire taut. Any slack on the return of the feed device is taken up by the tension spring. The movement of the support 309 is limited by the pin 314 on the supporting arm 311 which engages in a segmental slot 315 in the sleeve 310.

The box bottom is stapled into the body by a single flap only, the object being to permit the collapsing of the box after the bottom is secured. The particular embodiment of my invention here described is designed for the manufacture of knockdown boxes.

The next step of the turret brings the forms to their discharging position and I will now describe the discharging or ejecting mechanism. This mechanism is best shown in Fig. III, Sheet 3, and Figs. LXV, LXVI, and LXVII, Sheet 29. The ejector 316 is mounted to reciprocate on the vertically disposed way 317 and is provided with a pair of arms 318 and 319 having inwardly projecting pins or fingers 320 adapted to engage the edge of the box and carry it from the form as the ejector moves downward. These pins project into grooves 321 in the sides of the form so as to release the clamp prior to the actuation of the ejector, the clamp being shown in its open position in Fig. LXV, Sheet 29. The ejector is actuated by the lever 322 pivoted at 323 on the bracket 324 and provided with a roller 325 engaging the actuating cam 326 which is mounted on the main shaft 11. See Fig. LXV, Sheet 29. The spring 327 takes up any slack in the cam and roller. The lever is connected to the ejector by the link 328.

The boxes are discharged from the forms into the chute 329 disposed at the side of the machine to deliver at the rear thereof, see Fig. III, Sheet 3 and Fig. LXVII, Sheet 29. The boxes are discharged from the chute by the plunger 330, the plunger being connected by the pitman 331 to the lower end of the feed table actuating lever 14, see Fig. X, Sheet 9, and Fig. LXVII, Sheet 29. The ejector 316 is provided with an adjustable bearing member 332, see Fig. LXVI, Sheet 39. The die block carriage and the knife carriage are provided with adjustable bearing members 333, see Fig. LIX, Sheet 26.

To prevent the punchings of the bottom forming mechanism from clogging the machine I provide a clearing arm 334 which is pivoted at 335 adjacent the die plate. The yoke 195 on the paper feed slide 178 is provided with a tappet 336 which actuates the clearer on each stroke to deliver the punchings into the discharge chute 337, see Fig. XLV, Sheet 21.

I have designated the body blank as A, the bottom blank as B and the completed box by the letter C.

With the parts arranged as I have illustrated and described the stock is fed to the machine automatically from rolls. The body blanks are automatically formed and fed to the forms. The bodies are automatically stapled and brought to position to receive the bottoms which are also automatically formed and fed to the bodies and stapled thereto and the completed boxes are automatically discharged from the forms and at the rear of the machine.

My improved machine is of large capacity and requires little attention. The particular machine illustrated is designed for making berry boxes and can be readily adapted for the making of pint or quart boxes, it only being necessary to change the feed of the feed table as described.

I have not attempted to illustrate or describe various modifications and changes in structural details which I contemplate as I believe the disclosure made will enable those skilled in the art to embody or adopt the same as conditions may require.

Having thus described my invention, what I claim as new and desire to secure by Letters Patent, is:

1. In a structure of the class described, the combination of a feed table provided with spaced rearwardly projecting delivery fingers at its rear end, a block to which said feed table delivers, forwardly projecting receiving fingers on said block disposed so that said delivery fingers of said feed reciprocate between them, a plurality of stock holding bars disposed to rest on the stock fed across the table, the rear ends of said holding bars being disposed above said receiving fingers, a reciprocating cross head, a pair of relatively fixed feed jaws supported to reciprocate at the ends of said block, pivotally mounted coacting jaws, said cross head being adapted to release said jaws on its work stroke and to hold them open during the return stroke of the feed table, actuating springs for said jaws, means for holding the stock during the return stroke of the feed table, scoring knives carried by said feed table and disposed between said stock holding bars to act on the stock on the return stroke of the feed table, and a yielding guide bar mounted on said table to engage one edge of the stock.

2. In a structure of the class described, the combination of a feed table provided with spaced rearwardly projecting delivery fingers at its rear end, a block to which said feed table delivers, forwardly projecting receiving fingers on said block disposed so that said delivery fingers of said feed table reciprocate between them, a plurality of stock holding bars disposed to rest on the stock fed across the table, the rear ends of said holding bars being disposed above said receiving fingers, a reciprocating cross head, feed jaws carried by said table, said cross head being adapted to release said jaws and to hold them open during the return stroke of the table, means actuated by said cross head for holding the stock during the return stroke of the feed table, scoring knives carried by said feed table and disposed between said holding bars to act on the stock on the return stroke of the feed table, a yieldingly supported guide bar mounted on said table to engage one edge of the stock, and operating connections for said cross head and feed table.

3. In a structure of the class described, the combination of a reciprocating feed table, a block to which said feed table delivers, a reciprocating cross head, feed jaws movable with said table, said cross head being adapted to release said jaws on its work stroke and to hold them open during the return stroke of the feed table, means for holding the stock during the return stroke of the feed table, and scoring knives carried by said feed table and adapted to act on the stock on the return stroke of the feed table.

4. In a structure of the class described, the combination of a feed table, a plurality of spaced stock holding bars disposed to rest on the stock fed across the table, feed jaws movable with the table, means for releasing said jaws at the limit of the feed stroke of the table and holding them open during the return stroke thereof, means for holding the stock during the return stroke of the feed table, and scoring knives carried by said feed table and disposed between said stock holding bars to act on the stock on the return stroke of the feed table.

5. In a structure of the class described, the combination of a feed table, feed jaws movable with the table, means for releasing said jaws at the limit of the feed stroke of the table and holding them open during the return stroke thereof, means for holding the stock during the return stroke of the feed table, and scoring knives carried by said feed table to act on the stock on the return stroke of the feed table.

6. In a structure of the class described, the combination of a feed table adapted to advance the stock step by step, means for holding the stock during the return stroke of the feed table, a plurality of circular scoring knives, a rock shaft, knife carriers mounted on said rock shaft, rollers mounted on the table to support the stock as it is acted upon by the knives on the return stroke of the feed table, a slotted arm on said rock shaft, and a lever having a pin engaging said slot whereby the rock shaft is tilted to shift the knives to and from their operative position.

7. In a structure of the class described, the combination of a feed table adapted to advance the stock step by step, means for holding the stock during the return stroke of the feed table, a plurality of circular scoring knives, a rock shaft, knife carriers mounted on said rock shaft, and rollers mounted on the table to support the stock as it is acted upon by the knives on the return stroke of the feed table.

8. In a structure of the class described, the combination of a blank forming means comprising a reciprocating cross head, means for delivering the blanks from the forming means comprising a way for the blanks, a reciprocating carriage, means for actuating said carriage having operative connection with the said cross head, a jaw pivotally mounted on said carriage to clamp one end of a blank thereto, a lever for actuating said jaw pivotally mounted on said carriage, a spring pressed member mounted on said lever to engage said jaw whereby the jaw is retained in its open and closed positions and is actuated with a snap-like movement as said lever is oscillated on its pivot, a roller on said lever, and an arm on said cross head projecting over said carriage and provided with a pair of tripping cams, one of which is adapted to engage said roller on the down stroke of the cross head to actuate the jaw and the other of which is adapted to engage the roller on the up stroke of the cross head to release the jaw.

9. In a structure of the class described, the combination of a blank forming means comprising a reciprocating cross head, means for delivering the blanks from the forming means comprising a way for the blanks, a reciprocating carriage, means for actuating said carriage having operative connection with the said cross head, a jaw pivotally mounted on said carriage to clamp one end of a blank thereto, a lever for actuating said jaw pivotally mounted on said carriage, a roller on said lever, and an arm on said cross head projecting over said carriage and provided with a pair of tripping cams, one of which is adapted to engage said roller on the down stroke of the cross head to actuate the jaw and the other of which is adapted to engage the roller on the up stroke of the cross head to release the jaw.

10. In a structure of the class described, the combination of a blank forming means comprising a reciprocating cross head, means for delivering the blanks from the forming means comprising a way for the blanks, a reciprocating carriage, a jaw pivotally mounted on said carriage to clamp one end of a blank thereto, a lever for actuating said jaw pivotally mounted on said carriage, a spring pressed member mounted on said lever to engage said jaw whereby the jaw is retained in its open and closed positions and is actuated with a snap-like movement as said lever is oscillated on its pivot, and trips on said cross head, one of which is adapted to engage said lever on the down stroke of the cross head to actuate the jaw and the other of which is adapted to engage the lever on the up stroke of the cross head to release the jaw.

11. In a structure of the class described, the combination of a blank forming means comprising a reciprocating cross head, means for delivering the blanks from the forming means comprising a way for the blanks, a reciprocating carriage, a jaw pivotally mounted on said carriage to clamp one end of a blank thereto, a lever for actuating said jaw pivotally mounted on said carriage, and trips on said cross head, one of which is adapted to engage said lever on the down stroke of the cross head to actuate the jaw and the other of which is adapted to engage the lever on the up stroke of the cross head to release the jaw.

12. In a structure of the class described, the combination with a blank forming means comprising a reciprocating cross head, means for delivering the blanks from the forming means comprising a way for the blanks, a reciprocating carriage provided with a blank engaging jaw, said cross head being provided with means for engaging and releasing said jaw, and operating connections for said carriage and cross head.

13. In a structure of the class described, the combination with a blank forming means comprising a reciprocating cross head, means for delivering the blanks from the forming means comprising a way for the blanks, and a reciprocating carriage provided with a blank engaging jaw, said head being provided with means for engaging and releasing said jaw.

14. In a structure of the class described, the combination of a turret having forms radially disposed thereon, means for rotating said turret with a step by step movement, means for delivering blanks to the front sides of said forms, clamps pivotally mounted on said turret to clamp the blanks to the front sides of said forms, said clamps being provided with arms having cam engaging rollers thereon, an oscillating cam shaft arranged axially of said turret shaft, a cam on which said rollers travel as the turret revolves mounted on said cam shaft, a pair of preliminary blank folding arms between which the blanks are carried as the forms move to stapling position, a pair of folders between which the forms are disposed when in stapling position, said folders being adapted to fold and clamp the blanks upon the forms, a swinging stapling head, means actuated with said stapling head for opening said folders when the stapling head is in its retracted position, said folders being actuated when said stapling head is actuated, means for actuating said cam shaft whereby the form clamps are released while the forms are in their bottom receiving positions, means for shifting the bodies to bottom receiving position on said forms, means for inserting the bottoms into the bodies, a bottom stapler, and an ejector for the completed boxes, said clamp control cam being adapted to release the clamps when the forms are in discharging position and to hold them open when the forms are in receiving position.

15. In a structure of the class described, the combination of a turret having forms radially disposed thereon, means for rotating said turret with a step by step movement, means for delivering blanks to the front sides of said forms, clamps pivotally mounted on said turret to clamp the blanks to the front sides of said forms, said clamps being provided with arms having cam engaging rollers thereon, an oscillating cam shaft arranged axially of said turret shaft, a cam on which said rollers travel as the turret revolves mounted on said cam shaft, a pair of folders between which the forms are disposed when in stapling position, said folders being adapted to fold and clamp the blanks upon the forms, a swinging stapling head, means actuated with said stapling head for opening said folders when the stapling head is in its retracted position, said folders being actuated when said stapling head is actuated, means for actuating said cam shaft whereby the form clamps are released while the forms are in their bottom receiving positions, means for shifting the bodies to bottom receiving position on said forms, means for inserting the bottoms into the bodies, a bottom stapler, and an ejector for the completed boxes, said clamp control cam being adapted to release the clamps when the forms are in discharging position and to hold them open when the forms are in receiving position.

16. In a structure of the class described, the combination of a turret having forms radially disposed thereon, means for rotating said turret with a step by step movement, means for delivering blanks to the front sides of said forms, clamps pivotally mounted on said turret to clamp the blanks to the front sides of said forms, said clamps being provided with arms having cam engaging rollers thereon, a cam shaft arranged axially of said turret shaft, a cam on which said rollers travel as the turret revolves mounted on said cam shaft, a pair of preliminary blank folding arms between which the blanks are carried as the forms move to stapling position, a pair of folders between which the forms are disposed when in stapling position, said folders being adapted to fold and clamp the blanks upon the forms, a swinging stapling head, means actuated with said stapling head for opening said folders when the stapling head is in its retracted position, said folders being actuated when said stapling head is actuated, said clamp control cam being adapted to release the clamps when the forms are in discharging position and to hold them open when the forms are in receiving position.

17. In a structure of the class described, the combination of a turret having forms radially disposed thereon, means for rotating said turret with a step by step movement, means for delivering blanks to the front sides of said forms, clamps pivotally mounted on said turret to clamp the blanks to the front sides of said forms, said clamps being provided with arms having cam engaging rollers thereon, a cam shaft arranged axially of said turret shaft, a cam on which said rollers travel as the turret revolves mounted on said cam shaft, a pair of folders between which the forms are disposed when in stapling position, said folders being adapted to fold and clamp the blanks upon the forms, a swinging stapling head, means actuated with said stapling head for opening said folders when the stapling head is in its retracted position, said folders being actuated when said stapling head is actuated, said clamp control cam being adapted to release the clamps when the forms are in discharging position and to hold them open when the forms are in receiving position.

18. In a structure of the class described, the combination of a turret having forms thereon, means for rotating said turret with a step by step movement, clamps mounted on said turret to clamp the blanks to the forms, an oscillating cam shaft arranged axially of said turret shaft, a clamp control cam about which said forms rotate mounted on said shaft, means for folding the blanks upon the forms, a body stapling means, means for actuating said cam shaft whereby the form clamps are released while the forms are in their bottom receiving positions, means for shifting the bodies to bottom receiving position on said forms, means for inserting the bottoms into the bodies, a bottom stapler, and an ejector for the completed boxes, said clamp control cam being adapted to release the clamps when the forms are in discharging position and to hold them open when the forms are in receiving position.

19. In a structure of the class described, the combination of a turret having forms thereon, means for rotating said turret with a step by step movement, clamps mounted on said turret to clamp the blanks to the forms, an oscillating cam shaft arranged axially of said turret shaft, a clamp control cam about which said forms rotate mounted on said shaft, means for folding the blanks upon the forms, a body stapling means, means for actuating said cam shaft whereby the form clamps are released while the forms are in their bottom receiving positions, means for shifting the bodies to bottom receiving position on said forms, means for inserting the bottoms into the bodies, and a bottom stapler.

20. In a structure of the class described, the combination of a turret having forms thereon, means for rotating said turret with a step by step movement, blank clamps for said forms, a clamp control cam, means for folding the blanks upon said forms, a body stapling means, means for actuating said cam whereby the form clamps are released while the forms are in their bottom receiving position, means for shifting the bodies to bottom receiving position on the forms, means for inserting the bottoms into the bodies, a bottom stapling means, and an ejector for the completed boxes, said clamp cam being adapted to release the clamps when the forms are in discharging position and to hold them open when the forms are in receiving position.

21. In a structure of the class described, the combination of a turret having forms thereon, means for rotating said turret with a step by step movement, clamps mounted on said turret to clamp the blanks to the forms, a clamp control cam about which said forms rotate mounted on said shaft, means for folding the blanks upon the forms, a stapling means, and an ejector for the completed boxes, said control clamp cam being adapted to release the clamps when the forms are in discharging position and to hold them open when the forms are in receiving position.

22. In a structure of the class described, the combination of a turret having forms radially disposed thereon, means for rotating said turret with a step by step movement, means for delivering blanks to the front sides of said forms, clamps pivotally mounted on said turret to clamp the blanks to the front sides of said forms, a cam shaft arranged axially of said turret, a clamp controlling cam mounted on said cam shaft, a pair of pivotally mounted folders between which the forms are disposed when in stapling position, said folders being adapted to fold and clamp blanks upon opposite sides of the forms and being provided with flanges adapted to close over the stapling side of the form and fold the overlapping portions of the blank thereon, a spring connected to said folders for actuating them to their closed positions, inwardly projecting arms on said folders provided with rollers, a swinging stapling head, and a member actuated with said stapling head swinging between said rollers on said folder arms when the stapling head swings to its retracted position whereby the folders are opened and held in open position, and permitting them to close when the stapling head is actuated.

23. In a structure of the class described, the combination of a turret having forms radially disposed thereon, means for rotating said turret with a step by step movement, means for delivering blanks to the front sides of said forms, clamps pivotally mounted on said turret to clamp the blanks to the front sides of said forms, a cam shaft arranged axially of said turret, a clamp controlling cam mounted on said cam shaft, a pair of preliminary blank folding arms between which the blanks are carried as the forms move to stapling position, a pair of pivotally mounted folders between which the forms are disposed when in stapling position, said folders being adapted to fold and clamp the blanks upon opposite sides of the forms and being provided with flanges adapted to close over the stapling side of the form and fold the overlapping portions of the blank thereon, a swinging stapling head, and means actuated with said stapling head for opening said folders when the stapling head is in its retracted position whereby the folders are opened and held in open position and permitting them to close when the stapling head is actuated.

24. In a structure of the class described, the combination of a turret having forms radially disposed thereon, means for rotating said turret with a step by step movement, means for delivering blanks to the front sides of said forms, clamps pivotally mounted on said turret to clamp the blanks to the front sides of said forms, a cam shaft arranged axially of said turret, a clamp controlling cam mounted on said cam shaft, a pair of pivotally mounted folders between which the forms are disposed when in stapling position, said folders being adapted to fold and clamp the blanks upon opposite sides of the forms and being provided with flanges adapted to close over the stapling side of the form and fold the overlapping portions of the blank thereon, a swinging stapling head, and means actuated with said stapling head for opening said folders when the stapling head is in its retracted position whereby the folders are opened and held in open position and permitting them to close when the stapling head is actuated.

25. In a structure of the class described, the combination of a turret having forms thereon, means for rotating said turret with a step by step movement, blank clamps for said forms, an oscillating cam shaft disposed axially of said turret, a clamp controlling cam mounted on said cam shaft, means for folding the blanks upon said forms, a body stapling means, means for actuating said cam shaft whereby the form clamps are released while the forms are in their bottom receiving position, body shifting push bars mounted within the forms and engaging the edges of the bodies thereon, an actuating cam for said push bars carried by said cam shaft, means for inserting the bottoms into the bodies, a bottom stapling means, and an ejector for the completed boxes, said clamp cam being adapted to release the clamps when the forms are in discharging position and to hold them open when the forms are in receiving position.

26. In a structure of the class described, the combination of a turret having forms thereon, means for rotating said turret with a step by step movement, blank clamps for said forms, an oscillating cam shaft disposed axially of said turret, a clamp controlling cam mounted on said cam shaft, means for folding the blanks upon said forms, a body stapling means, means for actuating said cam shaft whereby the form clamps are released while the forms are in their bottom receiving position, body shifting push bars mounted within the forms and engaging the edges of the bodies thereon, an actuating cam for said push bars carried by said cam shaft, means for inserting the bottoms into the bodies, and a bottom stapling means.

27. In a structure of the class described, the combination of a turret having forms thereon, means for rotating said turret with a step by step movement, means for folding the blanks on said forms, a staple setting means, staple clenching jaws provided with opposed racks carried by said forms, a pinion connecting said racks, actuating rock shafts for said jaws carried by said forms and having arms engaging one jaw of each pair, said rock shafts having actuating arms thereon, and an actuating cam with which said rock shaft actuating arms successively engage as the turret revolves.

28. In a structure of the class described, the combination of means for feeding the stock with a step by step movement, a die plate provided with female die members and with a pair of transversely disposed spaced scoring blades and with longitudinally disposed scoring blades extending across the ends of said transversely disposed scoring blades, there being a recess between said transversely disposed scoring blades, a stripping bar yieldingly supported to collapse into said recess, said bar being normally supported with its face beyond the edges of the knives, a fixed stripping plate supported in a spaced relation to said die plate, the stock being fed between said fixed stripping plate and said die plate, a reciprocating die member provided with portions opposite said scoring blades adapted to press the stock against the blades and with male die members coacting with said female die members of said die plate, there being a pair of notching die members adapted to notch the edges of the stock and spaced perforating dies disposed between the notching dies, the notching dies and transverse scoring blades being spaced so that when the stock is advanced the scores formed by the transverse scoring blades aline with the ends of the notches and the scores formed by the longitudinal scoring blades aline with the inner ends of the notches, a shear bar, a coacting cutter blade, the shear bar and cutter blade being positioned so that the punched and scored stock is severed between the transverse scores formed therein and between the perforations formed by said perforating dies, a spring support arranged between the die plate and the shear bar to guide the stock across the shear bar, the plate being adapted to yield on the actuation of the cutter blade, and a spring pressed plunger carried by said die member, said fixed stripping plate being provided with an opening through which the plunger engages the stock, the plunger being adapted to engage the stock during the action of the knives and dies thereon.

29. In a structure of the class described, the combination of means for feeding the stock with a step by step movement, a die plate provided with female die members and with a pair of transversely disposed spaced scoring blades and with longitudinally disposed scoring blades extending across the ends of said transversely disposed scoring blades, there being a recess between said transversely disposed scoring blades, a stripping bar yieldingly supported to collapse into said recess, said bar being normally supported with its face beyond the edges of the knives, a fixed stripping plate supported in a spaced relation to said die plate, the stock being fed between said fixed stripping plate and said die plate, a reciprocating die member provided with portions opposite said scoring blades adapted to press the stock against the blades and with male die members coacting with said female die members of said die plate, there being a pair of notching die members adapted to notch the edges of the stock and spaced perforating dies disposed between the notching dies, the notching dies and transverse scoring blades being spaced so that when the stock is advanced the scores formed by the transverse scoring blades aline with the ends of the notches and the scores formed by the longitudinal scoring blades aline with the inner ends of the notches, a shear bar, a coacting cutter blade, the shear bar and cutter blade being positioned so that the punched and scored stock is severed between the transverse scores formed therein and between the perforations formed by said perforating dies, and a spring support arranged between the die plate and the shear bar to guide the stock across the shear bar, the plate being adapted to yield on the actuating of the cutter blade.

30. In a structure of the class described, the combination of means for feeding the stock with a step by step movement, a die plate provided with female die members and with a pair of transversely disposed spaced scoring blades and with longitudinally disposed scoring blades extending across the ends of said transversely disposed scoring blades, a reciprocating die member provided with portions opposite said scoring blades adapted to press the stock against the blades and with male die members coacting with said female die members of said die plate, there being a pair of notching die members adapted to notch the edges of the stock and spaced perforating dies disposed between the notching dies, the notching dies and transverse scoring blades being spaced so that when the stock is advanced the scores formed by the transverse scoring blades aline with the ends of the notches and the scores formed by the longitudinal scoring blades aline with the inner ends of the notches, a shear bar, and a coacting cutter blade, the shear bar and cutter blade being positioned so that the punched and scored stock is severed between the transverse scores formed therein and between the perforations formed by said perforating dies.

31. In a structure of the class described, the combination of means for feeding the stock with a step by step movement, a die plate provided with female die members and with a pair of transversely disposed spaced scoring blades and with longitudinally disposed scoring blades extending across the ends of said transversely disposed scoring blades, there being a recess between said transversely disposed scoring blades, a stripping bar yieldingly supported to collapse into said recess, said bar being normally supported with its face beyond the edges of the knives, a fixed stripping plate supported in a spaced relation to said die plate, the stock being fed between said fixed stripping plate and said die plate, a reciprocating die member provided with portions opposite said scoring blades adapted to press the stock against the blades and with male die members coacting with said female die members of said die plate, a shear bar, a coacting cutter blade, the shear bar and cutter blade being positioned so that the punched and scored stock is severed between the transverse scores formed therein, a spring support arranged between the die plate and the shear bar to guide the stock across the shear bar, the plate being adapted to yield on the actuating of the cutter blade, and a spring pressed plunger carried by said die member, said fixed stripping plate being provided with an opening through which the plunger engages the stock, the plunger being adapted to engage the stock during the action of the knives and dies thereon.

32. In a structure of the class described, the combination of means for feeding the stock with a step by step movement, a die plate provided with female die members and with a pair of transversely disposed spaced scoring blades and with longitudinally disposed scoring blades extending across the ends of said transversely disposed scoring blades, a reciprocating die member provided with portions opposite said scoring blades adapted to press the stock against the blades and with male die members coacting with said female die members of said die plate, a shear bar, and a coacting cutter blade, the shear bar and cutter blade being positioned so that the punched and scored stock is severed between the transverse scores formed therein.

33. In a structure of the class described, the combination of means for feeding the stock with a step by step movement, a die plate provided with a pair of transversely disposed spaced scoring blades, there being a recess between said transversely disposed spaced scoring blades, a stripping bar yieldingly supported to collapse into said recess, said bar being normally supported with its face beyond the edges of the knives, and a reciprocating die member being adapted to press the stock against said blades.

34. In a structure of the class described, the combination of a body forming means comprising a form turret actuated with a step by step movement, means for shifting the bodies on the forms to bottom receiving position, a bottom blank forming mechanism, a frame-like support to which said blanks are delivered alined with the box body forms when they are in bottom receiving position, a plunger reciprocating through said bottom blank support and adapted to introduce the bottoms into the bodies, a carriage on which said plunger is mounted, means for reciprocating said plunger carriage, a staple forming and setting means mounted on said plunger carriage, means for actuating said staple forming and setting means comprising a pair of pivoted actuating levers carried by the plunger carriage a cam member having a pair of cams thereon slidably mounted on said plunger carriage, means for reciprocating said cam member, a staple clenching means, and an actuating lever therefor, said cam member being adapted to actuate said staple setting lever.

35. In a structure of the class described, the combination of a body forming means comprising a form turret actuated with a step by step movement, means for shifting the bodies on the forms to bottom receiving position, a bottom blank forming mechanism, a frame-like support to which said blanks are delivered alined with the box body forms when they are in bottom receiving position, a plunger reciprocating through said bottom blank support and adapted to introduce the bottoms into the bodies, a carriage on which said plunger is mounted, means for reciprocating said plunger carriage, a staple setting means mounted on said plunger carriage, means for actuating said staple forming and setting means comprising a cam member, means for reciprocating said cam member, a staple clenching means, and an actuating lever therefor, said cam member being adapted to actuate said staple setting lever.

36. In a structure of the class described, the combination of a body forming means comprising a form turret actuated with a step by step movement, means for shifting the bodies on the forms to bottom receiving position, a bottom blank forming mechanism, a frame-like support to which said blanks are delivered alined with the box body forms when they are in bottom receiving position, a plunger reciprocating through said bottom blank support and adapted to introduce the bottoms into the bodies, a carriage on which said plunger is mounted, means for reciprocating said plunger carriage, a staple forming and setting means mounted on said plunger carriage, means for actuating said staple forming and setting means comprising a pair of pivoted actuating levers carried by the plunger carriage, a cam member having a pair of cams thereon slidably mounted on said plunger carriage, and means for reciprocating said cam member.

37. In a structure of the class described, the combination of a body forming means comprising a form turret actuated with a step by step movement, means for shifting the bodies on the forms to bottom receiving position, a bottom blank forming mechanism, a frame-like support to which said blanks are delivered alined with the box body forms when they are in bottom receiving position, a plunger reciprocating through said bottom blank support and adapted to introduce the bottoms into the bodies, a carriage on which said plunger is mounted, means for reciprocating said plunger carriage, a staple setting means mounted on said plunger carriage, means for actuating said staple forming and setting means comprising a cam member, and means for reciprocating said cam member.

38. In a structure of the class described, the combination of a body form, a bottom blank support, a plunger adapted to introduce the bottoms into the bodies, a carriage on which said plunger is mounted, means for reciprocating said plunger carriage, a staple forming and setting means mounted on said plunger carriage, means for actuating said staple forming and setting means comprising a pair of pivoted actuating levers carried by the plunger carriage, a cam member having a pair of cams thereon slidably mounted on said plunger carriage, means for reciprocating said cam member, a staple clenching means, and an actuating lever therefor, said cam member being adapted to actuate said staple setting lever.

39. In a structure of the class described, the combination of a body form, a bottom blank support, a plunger adapted to introduce the bottoms into the bodies, a carriage on which said plunger is mounted, means for reciprocating said plunger carriage, a staple setting means mounted on said plunger carriage, means for actuating said staple forming and setting means comprising a cam member, means for reciprocating said cam member, a staple clenching means, and an actuating lever therefor, said cam member being adapted to actuate said staple setting lever.

40. In a structure of the class described, the combination of a body form, a bottom blank support, a plunger adapted to introduce the bottoms into the bodies, a carriage on which said plunger is mounted, means for reciprocating said plunger carriage, a staple forming and setting means mounted on said plunger carriage, means for actuating said staple forming and setting means comprising a pair of pivoted actuating levers carried by the plunger carriage, a cam member having a pair of cams thereon slidably mounted on said plunger carriage, and means for reciprocating said cam member.

41. In a structure of the class described, the combination of a body form, a bottom blank support, a plunger adapted to introduce the bottoms into the bodies, a carriage on which said plunger is mounted, means for reciprocating said plunger carriage, a staple setting means mounted on said plunger carriage, means for actuating said staple forming and setting means comprising a cam member, and means for reciprocating said cam member.

42. In a structure of the class described, the combination of a body form, a bottom blank support, a plunger adapted to introduce the bottoms into the bodies, a carriage on which said plunger is mounted, means for reciprocating said plunger carriage, a staple setting means mounted on said plunger carriage, and means for actuating said staple setting means.

43. In a structure of the class described, the combination of a body forming means comprising a form turret actuated with a step by step movement, means for shifting the bodies on the forms to bottom receiving position, a bottom blank forming mechanism, a frame-like support to which said blanks are delivered alined with the box body forms when they are in bottom receiving position, a plunger reciprocating through said bottom blank support and adapted to introduce the bottoms into the bodies, a carriage on which said plunger is mounted, and means for reciprocating said plunger carriage.

44. In a structure of the class described, the combination of a body forming means comprising a form turret actuated with a step by step movement, means for shifting the bodies on the forms to bottom receiving position, a bottom blank forming mechanism, a support to which said blanks are delivered alined with the box body forms when they are in bottom receiving position, a plunger adapted to introduce the bottoms into the bodies, a carriage on which said plunger is mounted, means for reciprocating said plunger carriage, a staple setting means mounted on said plunger carriage, and means for actuating said staple setting means.

45. In a structure of the class described, the combination of a body forming means comprising a form turret rotated with a step by step movement, means for shifting the bodies on the forms to bottom receiving position, a bottom blank forming mechanism, a support to which said blanks are delivered, a reciprocating plunger adapted to introduce the bottoms into the bodies, and a staple setting means operatively associated with said reciprocating plunger.

46. In a structure of the class described, the combination of a turret having forms thereon, means for rotating said turret with a step by step movement, clamps mounted on said forms to clamp the blanks to the forms, means for folding the blanks upon the forms, a body stapling means, means for releasing the form clamps when the forms are in their bottom receiving position, means for shifting the bottoms to bottom receiving position, means for inserting the bottoms into the bodies, and a bottom stapling means.

47. In a structure of the class described, the combination of a box forming means comprising a form turret rotated with a step by step movement, means for ejecting the completed boxes from the forms, a discharge chute disposed below the forms when in their discharging position, said chute being provided with an upright receiving portion and a horizontal delivery portion, the receiving portion being adapted to receive the boxes as they are ejected from said forms and guide them to drop into the horizontal discharge portion, and a plunger reciprocating below said receiving portion of said chute, said ejecting means and plunger being successively actuated.

In witness whereof, I have hereunto set my hand and seal in the presence of two witnesses.

ALBERT S. HOWELL. [L. S.]

Witnesses:
MARK P. MEARS,
DONALD J. BELL.